US012083404B2

(12) United States Patent
Yamazaki et al.

(10) Patent No.: US 12,083,404 B2
(45) Date of Patent: Sep. 10, 2024

(54) INFORMATION PROCESSOR AND INFORMATION PROCESSING METHOD

(71) Applicant: SONY CORPORATION, Tokyo (JP)

(72) Inventors: Satoshi Yamazaki, Kanagawa (JP); Motoyuki Sugioka, Tokyo (JP); Takeshi Suzuki, Tokyo (JP); Kazuhiro Nakagomi, Tokyo (JP); Yoshiyuki Miyamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1286 days.

(21) Appl. No.: 16/617,249

(22) PCT Filed: Mar. 16, 2018

(86) PCT No.: PCT/JP2018/010434
§ 371 (c)(1),
(2) Date: Nov. 26, 2019

(87) PCT Pub. No.: WO2018/220948
PCT Pub. Date: Dec. 6, 2018

(65) Prior Publication Data
US 2020/0094122 A1  Mar. 26, 2020

(30) Foreign Application Priority Data
Jun. 2, 2017 (JP) ................ 2017-110341

(51) Int. Cl.
*A63B 71/06* (2006.01)
*A63B 69/36* (2006.01)

(52) U.S. Cl.
CPC ...... *A63B 71/0622* (2013.01); *A63B 69/3623* (2013.01); *A63B 2071/0625* (2013.01);
(Continued)

(58) Field of Classification Search
CPC ............ A63B 71/0622; A63B 69/3623; A63B 2071/0625; A63B 2071/0694; A63B 2220/05; A63B 2220/833
See application file for complete search history.

(56) References Cited

U.S. PATENT DOCUMENTS 9,061,212 B2 *  6/2015  Kikuchi .................. A63F 13/58
9,478,109 B2 * 10/2016  Rihn ....................... G06T 15/00
(Continued)

FOREIGN PATENT DOCUMENTS

CN      103987429 A    8/2014
EP        1854512 A1   11/2007
(Continued)

OTHER PUBLICATIONS

International Search Report and Written Opinion of PCT Application No. PCT/JP2018/010434, issued on May 1, 2018, 14 pages of ISRWO.
(Continued)

*Primary Examiner* — William H McCulloch, Jr.
(74) *Attorney, Agent, or Firm* — CHIP LAW GROUP

(57) ABSTRACT

Provided is a technique that makes it possible to more efficiently present feedback information from a second user to a first user regarding a playing state of the first user. An information processor is provided, which includes an acquisition section and a transmission control section. The acquisition section acquires feedback information regarding first generated information from a terminal of a second user different from a first user who plays golf. The first generated information is generated using a detected result of an event based on sensor information indicating information related to the first user who plays golf. The transmission control section controls transmission of the feedback information to a terminal of the first user.

20 Claims, 32 Drawing Sheets

(52) U.S. Cl.
CPC ... *A63B 2071/0694* (2013.01); *A63B 2220/05* (2013.01); *A63B 2220/833* (2013.01)

(56) References Cited

U.S. PATENT DOCUMENTS

| | | | |
|---|---|---|---|
| 9,604,136 B1* | 3/2017 | Ricky | A63B 69/3623 |
| 9,623,284 B2* | 4/2017 | Lafortune | A63B 69/3605 |
| 9,636,578 B1* | 5/2017 | Ricky | A63F 13/211 |
| 9,737,817 B1* | 8/2017 | Ricky | A63B 60/42 |
| 10,213,645 B1* | 2/2019 | Wu | A63B 24/0003 |
| 11,103,783 B2* | 8/2021 | Dawe | A63F 13/573 |
| 11,173,387 B2* | 11/2021 | Ricky | A63F 13/812 |
| 11,260,286 B2* | 3/2022 | Enokido | A63F 13/44 |
| 2004/0096085 A1 | 5/2004 | Matsumoto et al. | |
| 2007/0026958 A1* | 2/2007 | Barasch | A63B 69/36 |
| | | | 473/266 |
| 2007/0265104 A1* | 11/2007 | Haga | G10H 1/348 |
| | | | 473/37 |
| 2008/0059131 A1* | 3/2008 | Tokita | G06F 3/011 |
| | | | 703/5 |
| 2008/0175441 A1 | 7/2008 | Matsumoto et al. | |
| 2008/0261189 A1* | 10/2008 | Katayama | A63B 24/0003 |
| | | | 434/257 |
| 2009/0036237 A1* | 2/2009 | Nipper | A63B 24/0006 |
| | | | 473/409 |
| 2009/0069105 A1* | 3/2009 | Holland | A63B 69/3623 |
| | | | 700/91 |
| 2009/0208061 A1* | 8/2009 | Matsumoto | A63B 69/36 |
| | | | 382/107 |
| 2010/0081116 A1* | 4/2010 | Barasch | G09B 19/0038 |
| | | | 434/308 |
| 2010/0201500 A1* | 8/2010 | Stirling | A63B 24/0006 |
| | | | 340/407.1 |
| 2010/0245232 A1* | 9/2010 | Birnbaum | A63F 13/92 |
| | | | 345/156 |
| 2011/0230274 A1* | 9/2011 | Lafortune | A63B 15/00 |
| | | | 473/217 |
| 2011/0250939 A1* | 10/2011 | Hobler | A63F 13/61 |
| | | | 463/7 |
| 2012/0309478 A1* | 12/2012 | Kotsugai | A63F 13/44 |
| | | | 463/31 |
| 2013/0017871 A1* | 1/2013 | Kikuchi | A63F 13/428 |
| | | | 463/3 |
| 2013/0239785 A1* | 9/2013 | Tabata | G10H 1/0008 |
| | | | 84/609 |
| 2014/0127659 A1* | 5/2014 | Barasch | A63B 69/36 |
| | | | 434/252 |
| 2014/0213382 A1* | 7/2014 | Kang | A63B 69/3632 |
| | | | 473/223 |
| 2015/0328516 A1* | 11/2015 | Coza | A63B 71/0619 |
| | | | 700/91 |
| 2016/0189493 A1* | 6/2016 | Rihn | G06T 15/00 |
| | | | 340/407.1 |
| 2017/0072283 A1* | 3/2017 | Davisson | A63B 24/0062 |
| 2018/0318715 A1* | 11/2018 | Dawe | A63F 13/573 |
| 2020/0094122 A1* | 3/2020 | Yamazaki | H04L 67/12 |
| 2020/0316459 A1* | 10/2020 | Ricky | A63F 13/245 |
| 2020/0324195 A1* | 10/2020 | Enokido | A63F 13/285 |
| 2021/0260472 A1* | 8/2021 | Fukushima | A63F 13/53 |
| 2022/0001236 A1* | 1/2022 | Mooney | G06F 18/00 |
| 2022/0152486 A1* | 5/2022 | Koda | A63F 13/812 |
| 2022/0355210 A1* | 11/2022 | Lee | A63F 13/52 |
| 2023/0032604 A1* | 2/2023 | Lee | A63B 24/0021 |

FOREIGN PATENT DOCUMENTS

| | | |
|---|---|---|
| JP | 2003-088604 A | 3/2003 |
| JP | 2003-208479 A | 7/2003 |
| JP | 2004-164563 A | 6/2004 |
| JP | 2006130079 A | 5/2006 |
| JP | 2009-020897 A | 1/2009 |
| JP | 2013-125024 A | 6/2013 |
| JP | 2013240506 A | 12/2013 |
| JP | 2014127835 A | 7/2014 |
| JP | 2015-502831 A | 1/2015 |
| JP | 2017-022727 A | 1/2017 |
| JP | 2017047057 A | 3/2017 |
| JP | 2017-064095 A | 4/2017 |
| KR | 10-2007-0102565 A | 10/2007 |
| KR | 10-2014-0090087 A | 7/2014 |
| WO | 2006/098096 A1 | 9/2006 |
| WO | 2007/016052 A2 | 2/2007 |
| WO | 2014/092213 A1 | 6/2014 |

OTHER PUBLICATIONS

Office Action for JP Patent Application No. 2019-521968, issued on Mar. 15, 2022, 08 pages of English Translation and 10 pages of Office Action.

Office Action for KR Patent Application No. 10-2019-7032982, issued on Jul. 8, 2022, 08 pages of English Translation and 09 pages of Office Action.

* cited by examiner

[ FIG. 1 ]
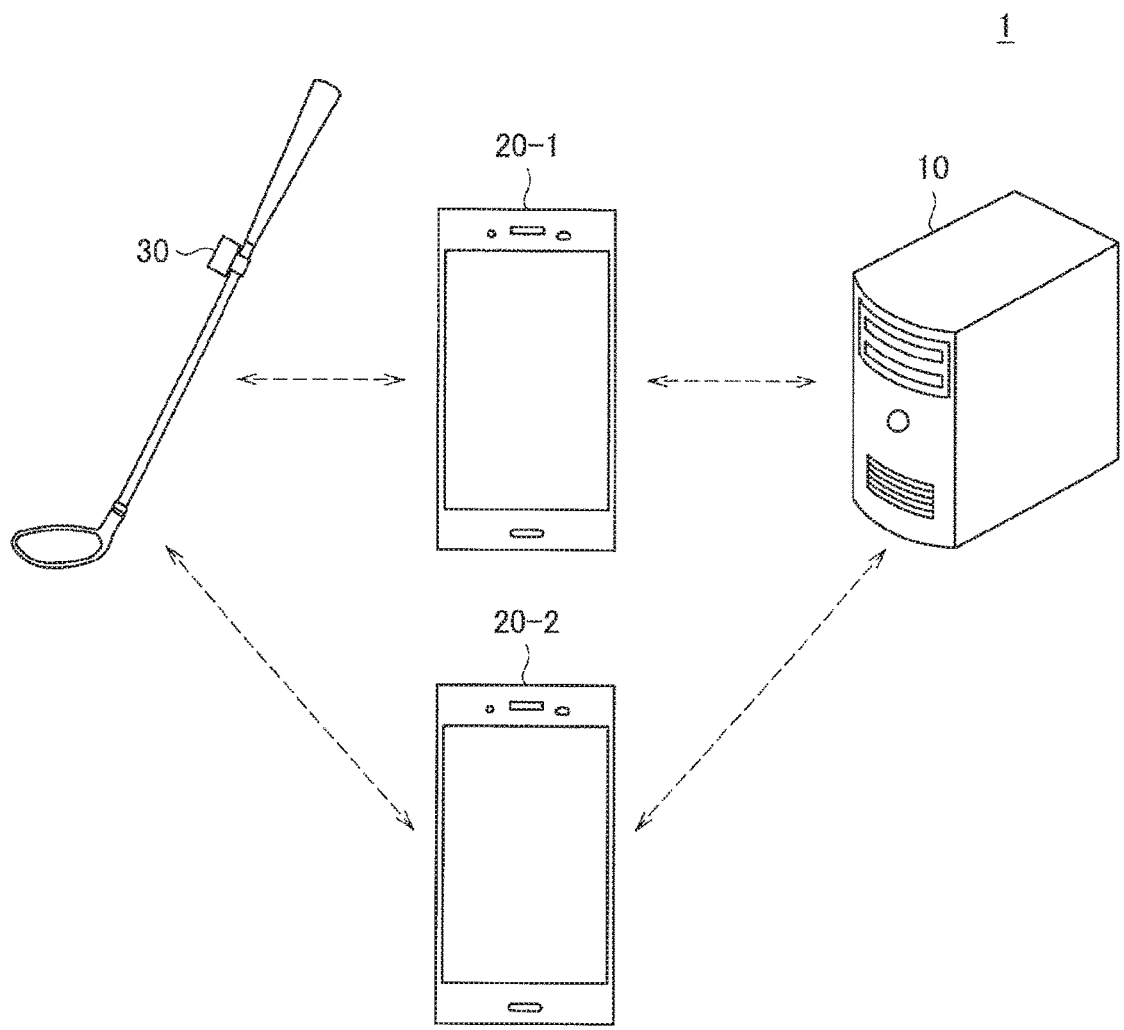

[FIG. 2]
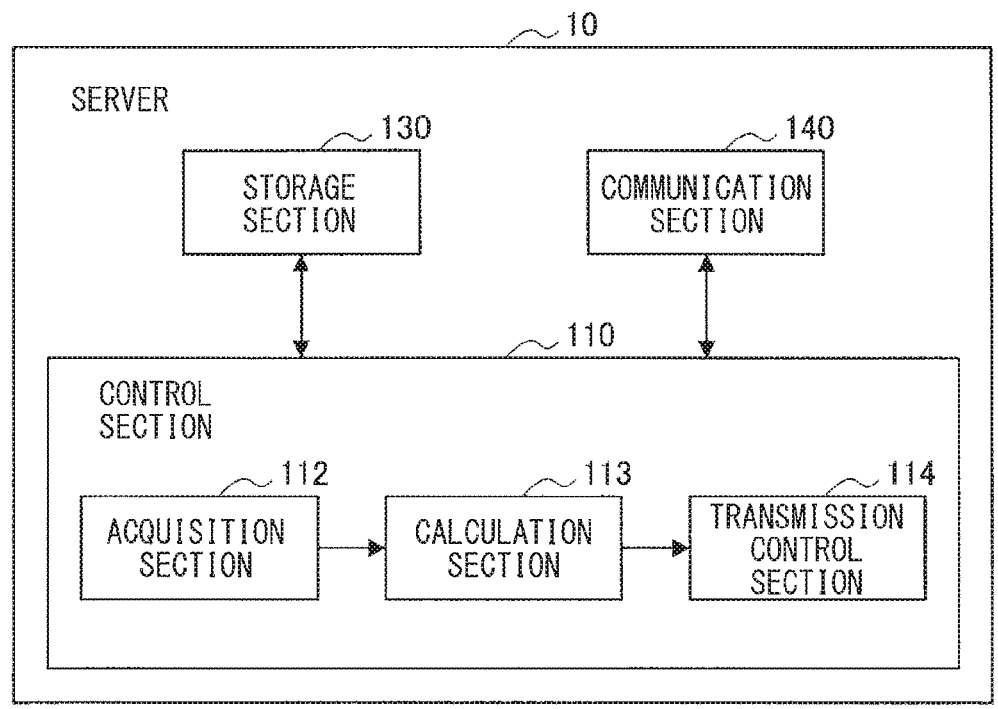
[FIG. 3]
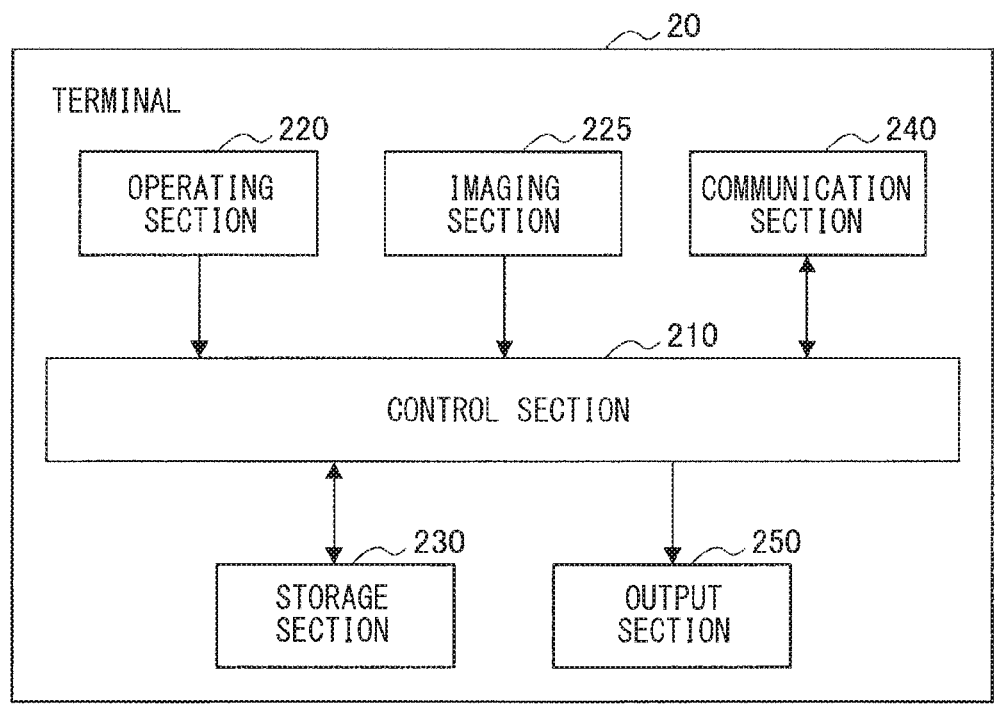

[FIG. 4]

| SENSOR TYPE | MAKER | MODEL NUMBER | DATA TYPE | FULL SCALE | ADC RESOLUTION |
|---|---|---|---|---|---|
| 6-AXIS SENSOR | MAKER A | MODEL NUMBER 01 | ACCELERATION | ±16G | 16bit |
| | | | ANGULAR VELOCITY | ±2000dps | 16bit |
| 6-AXIS SENSOR | MAKER B | MODEL NUMBER 02 | ACCELERATION | ±30G | 16bit |
| | | | ANGULAR VELOCITY | ±4000dps | 16bit |
| High-G ACCELERATION SENSOR | MAKER C | MODEL NUMBER 03 | ACCELERATION | ±200G | 16bit |

[FIG. 5]

| SENSOR TYPE | DATA TYPE | AXIS | Bit NUMBER | FULL SCALE | SAMPLING RATE |
|---|---|---|---|---|---|
| MAIN 6-AXIS | ACCELERATION | X,Y,Z | VARIOUS 16-bit | ±16G | 800Hz |
| | ANGULAR VELOCITY | X,Y,Z | VARIOUS 16-bit | ±2000dps | 800Hz |
| High ANGULAR VELOCITY | ANGULAR VELOCITY | X,Y,Z | VARIOUS 16-bit | ±4000dps | 1125Hz |
| High ACCELERATION | ACCELERATION | X,Y,Z | VARIOUS 16-bit | ±200G | 800Hz |

[FIG. 6]

| No. | OVERVIEW | DATA TYPE | |
|---|---|---|---|
| 1 | SWING STARTING TIME | MILLISECOND | |
| 2 | ANGLE OF CLUB FACE UPON IMPACT (FACE ANGLE) | ANGLE | −180° ~ 180° |
| 3 | COLLISION ANGLE (ATTACK ANGLE) BETWEEN CLUB FACE AND BALL UPON IMPACT | ANGLE | |
| 4 | ANGLE OF TRAJECTORY OF CLUB HEAD UPON IMPACT (CLUB PATH) | ANGLE | |
| 5 | HEAD SPEED UPON IMPACT | SPEED m/s | |
| 6 | SWING STARTING POINT | POINT WHERE SWING STARTING TIME IS SET TO 0 | |
| 7 | SWING TOP POINT | POINT WHERE SWING STARTING TIME IS SET TO 0 | |
| 8 | SWING IMPACT POINT | POINT WHERE SWING STARTING TIME IS SET TO 0 | |
| 9 | SWING END POINT | POINT WHERE SWING STARTING TIME IS SET TO 0 | |
| 10 | HITTING HAND (DOMINANT HAND) | RIGHT/LEFT | |
| 11 | INFORMATION ON SENSOR TRAJECTORY | X-Y-Z | |
| 12 | INFORMATION ON CLUB HEAD TRAJECTORY | X-Y-Z | |
| 13 | TIME SEQUENCE DATA OF SWING SPEED | TIME SEQUENCE DATA OF SPEED (m/s) FROM START TO END OF SWING | |
| 14 | TIME SEQUENCE DATA OF FACE ANGLE | TIME SEQUENCE DATA OF FACE ANGLE FROM START TO END OF SWING | |
| 15 | TIME SEQUENCE DATA OF ATTACK ANGLE | TIME SEQUENCE DATA OF ATTACK ANGLE FROM START TO END OF SWING | |
| 16 | TIME SEQUENCE DATA OF CLUB PATH | TIME SEQUENCE DATA OF CLUB PATH FROM START TO END OF SWING | |

[ FIG. 7 ]
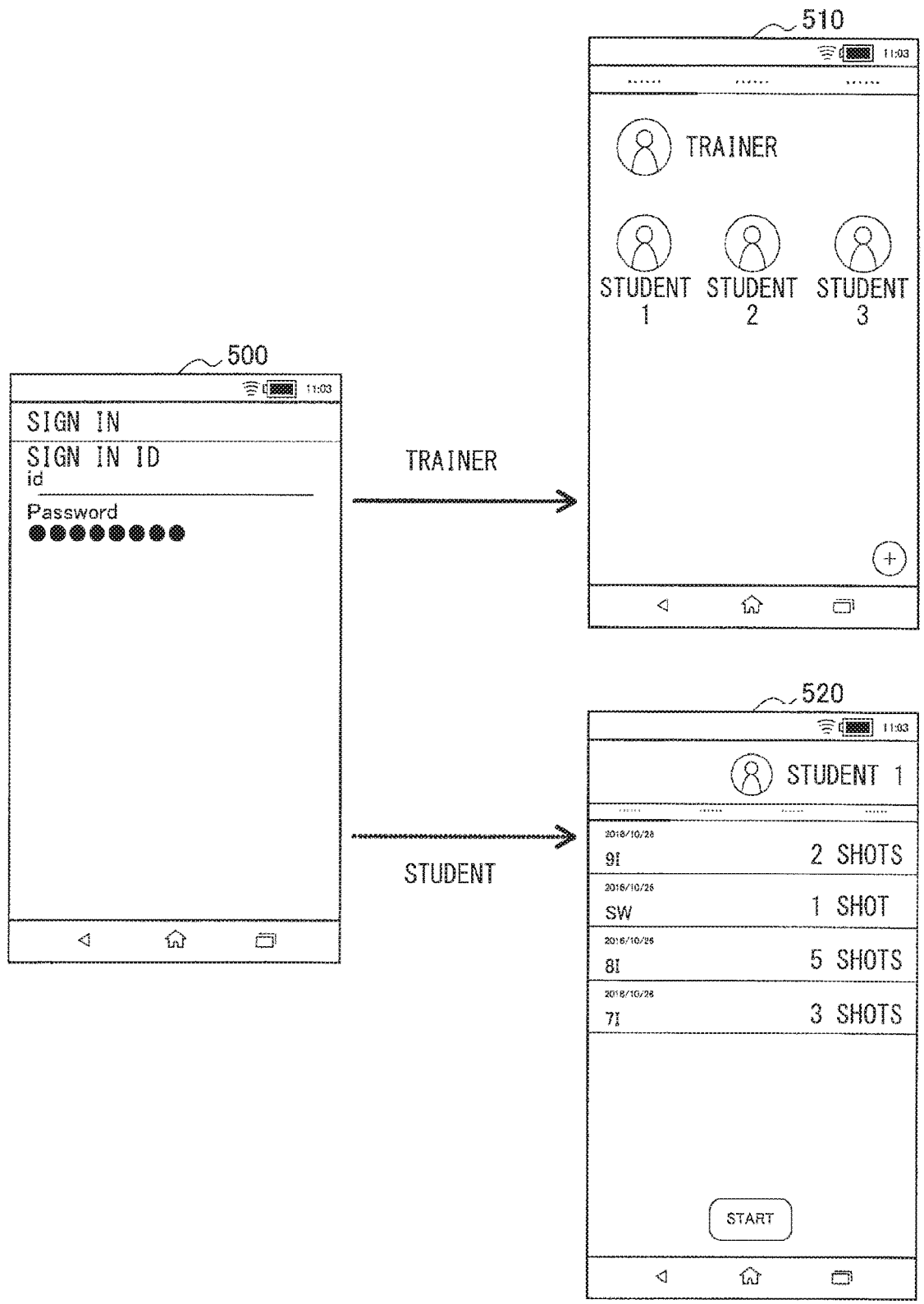

[FIG. 8]
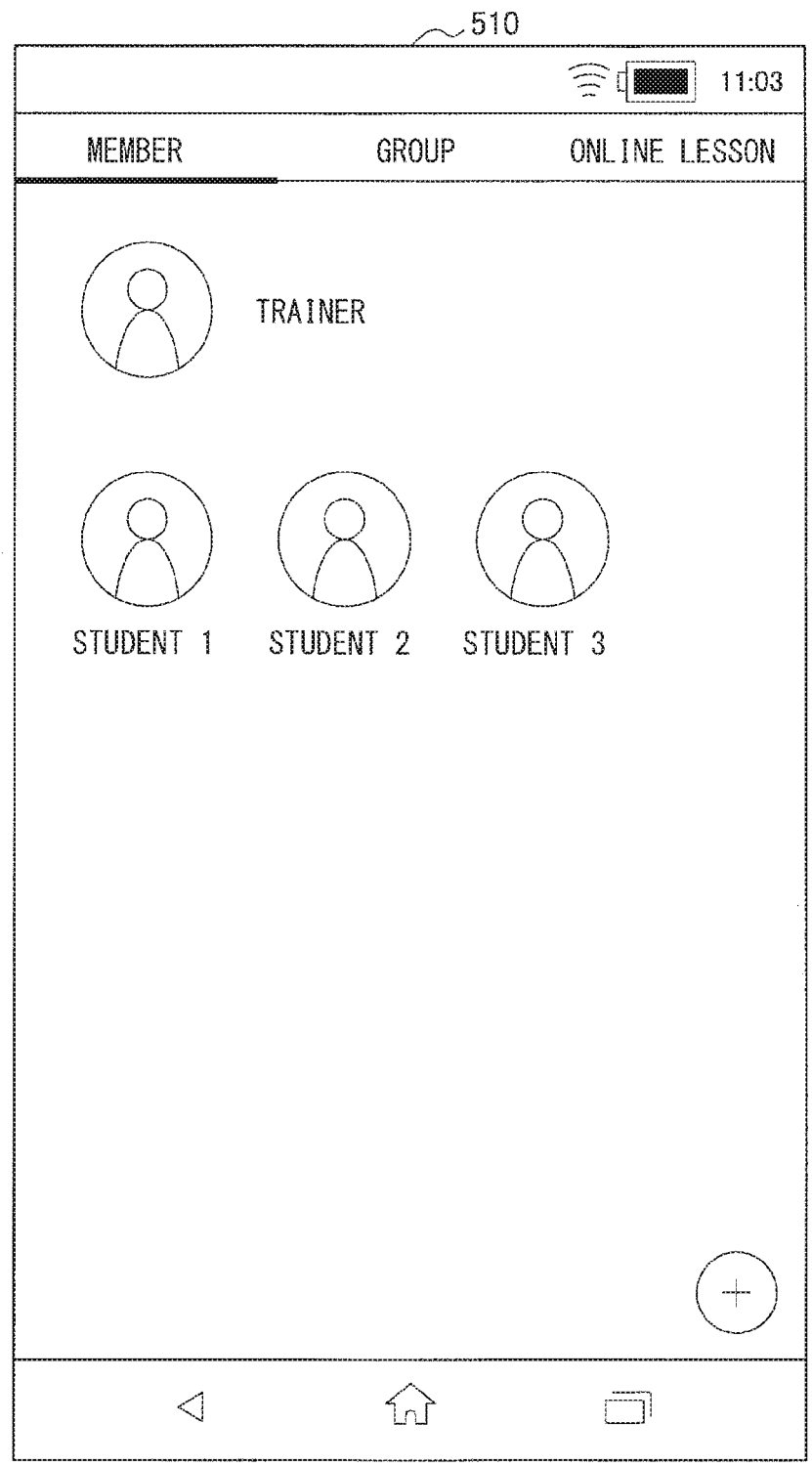

[FIG. 9]
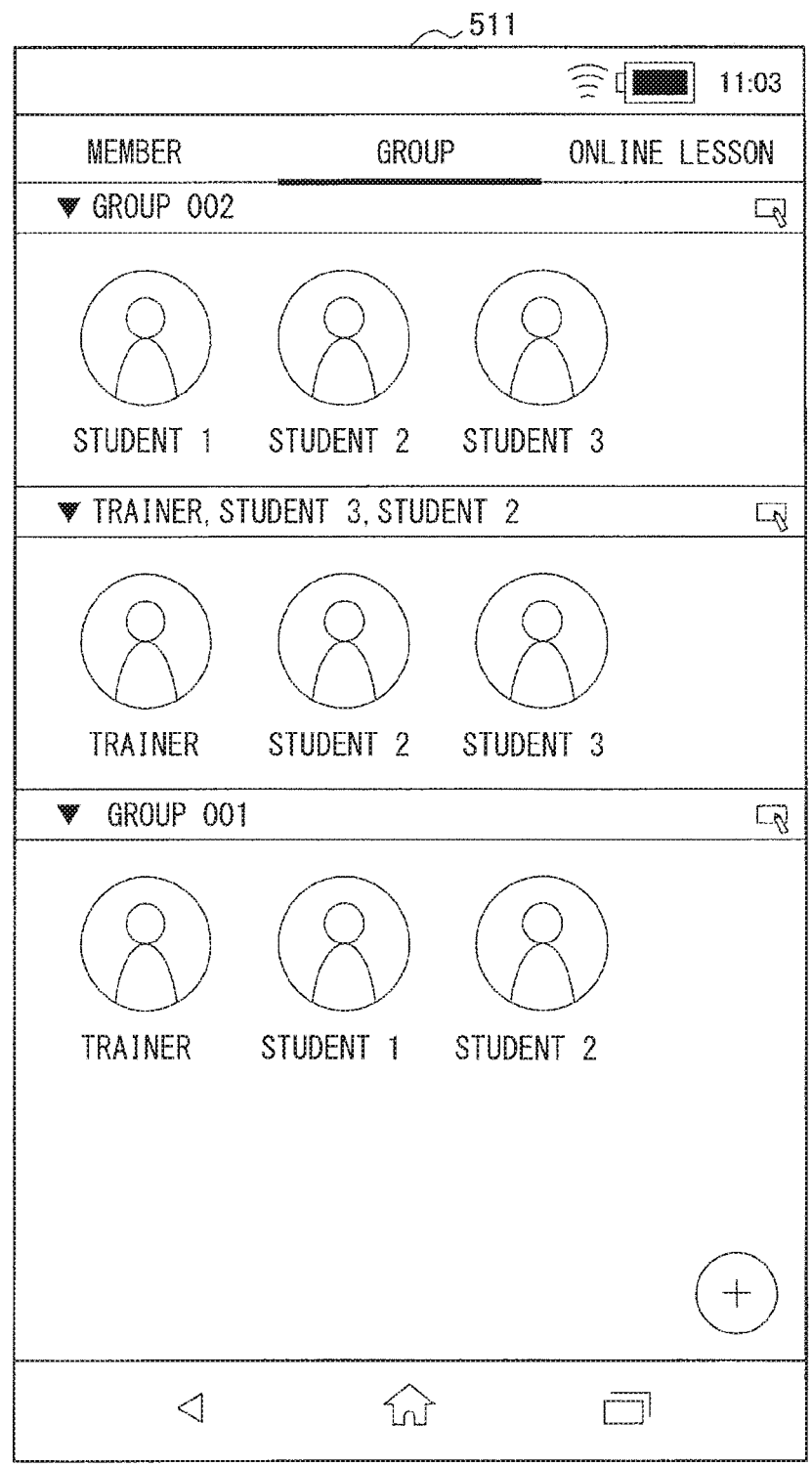

[FIG. 10]
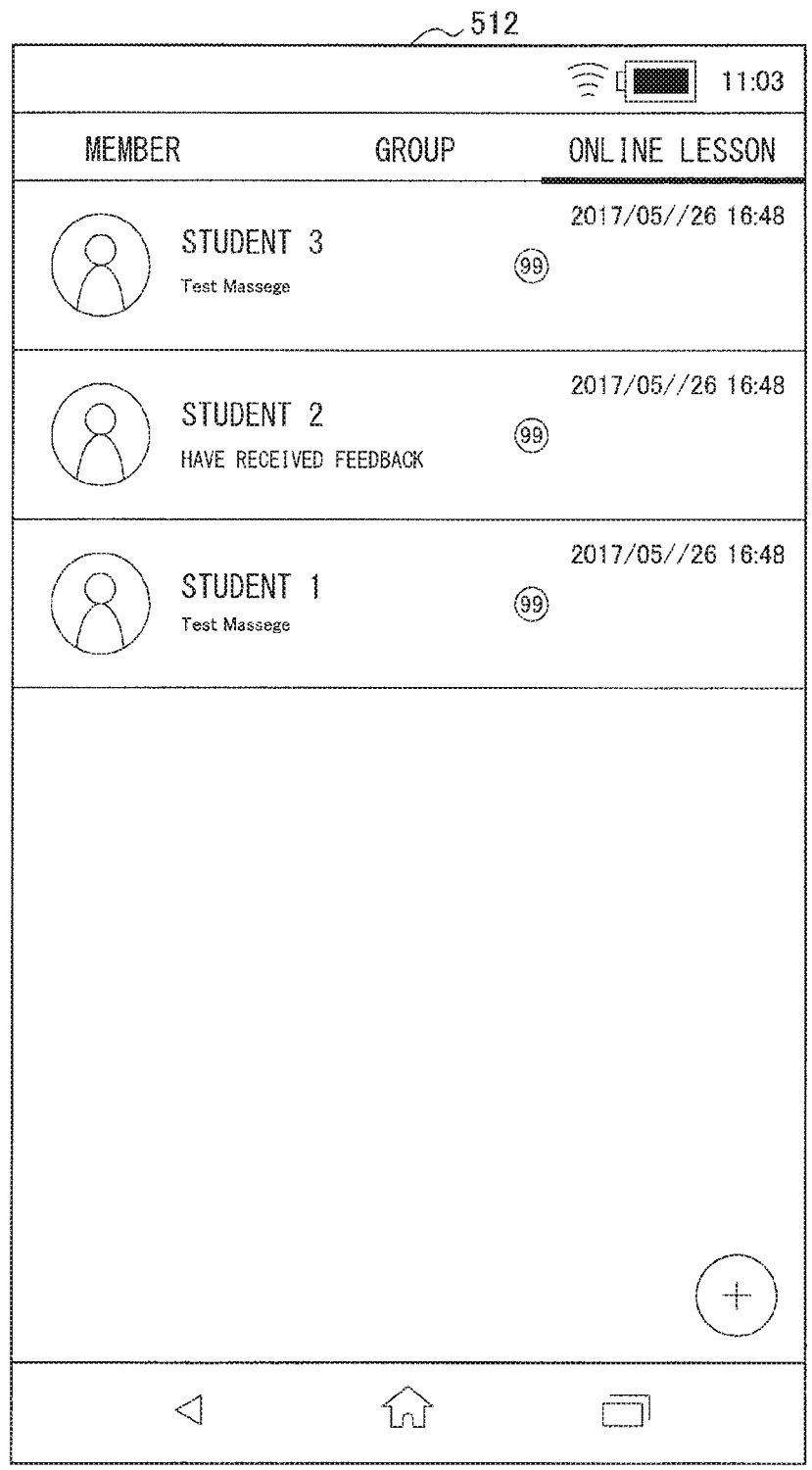

[FIG. 11]
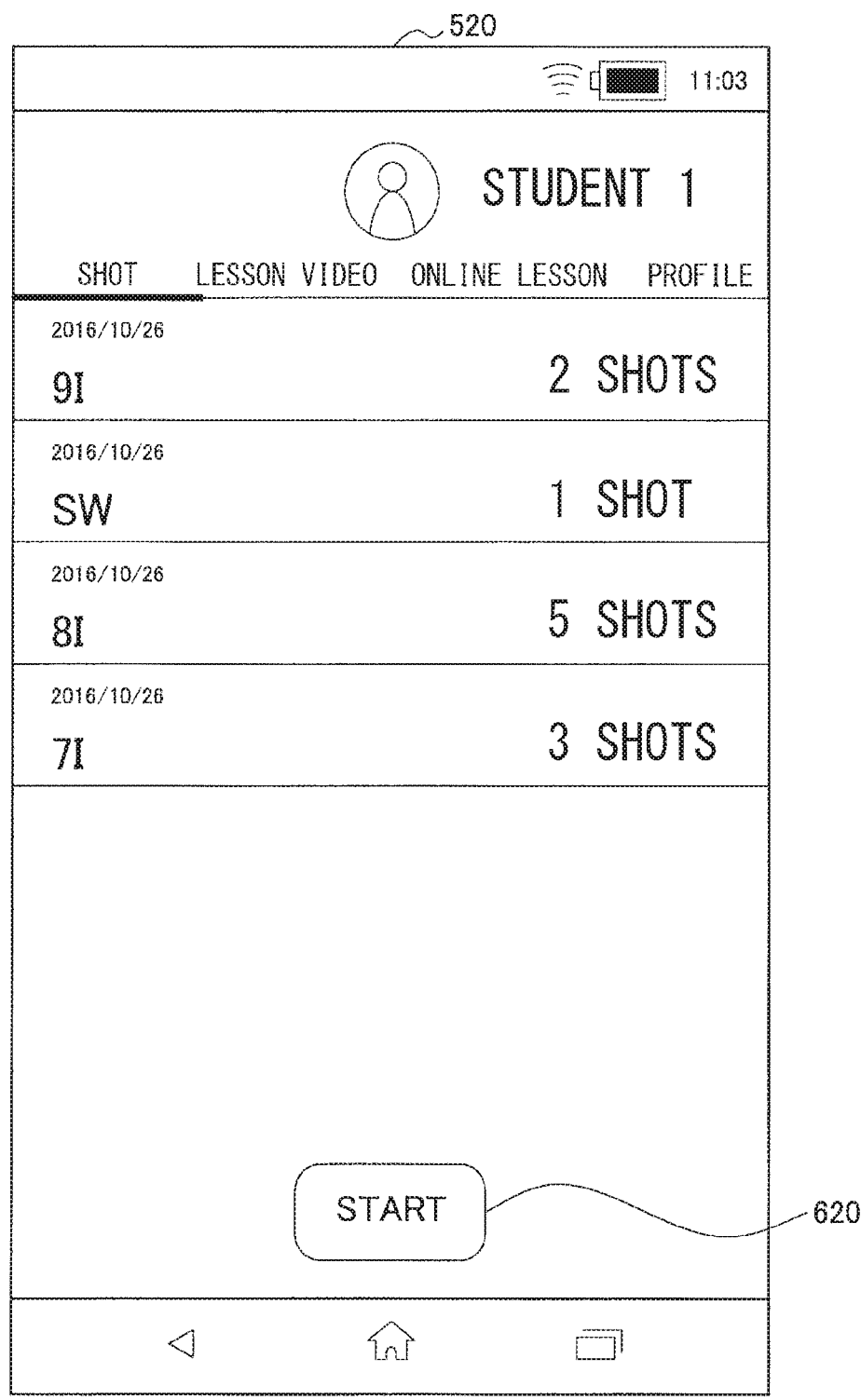

[FIG. 12]
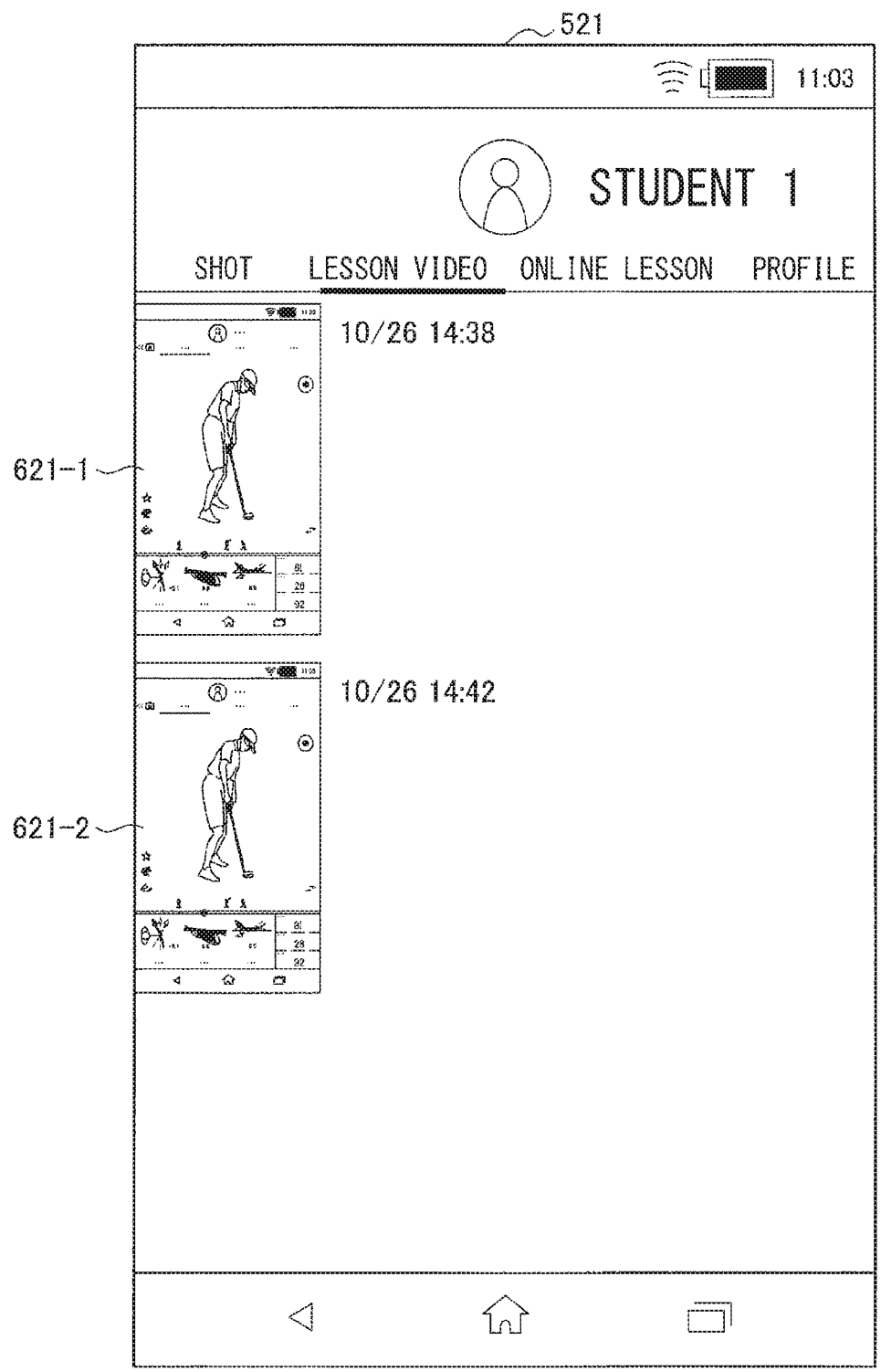

[FIG. 13]
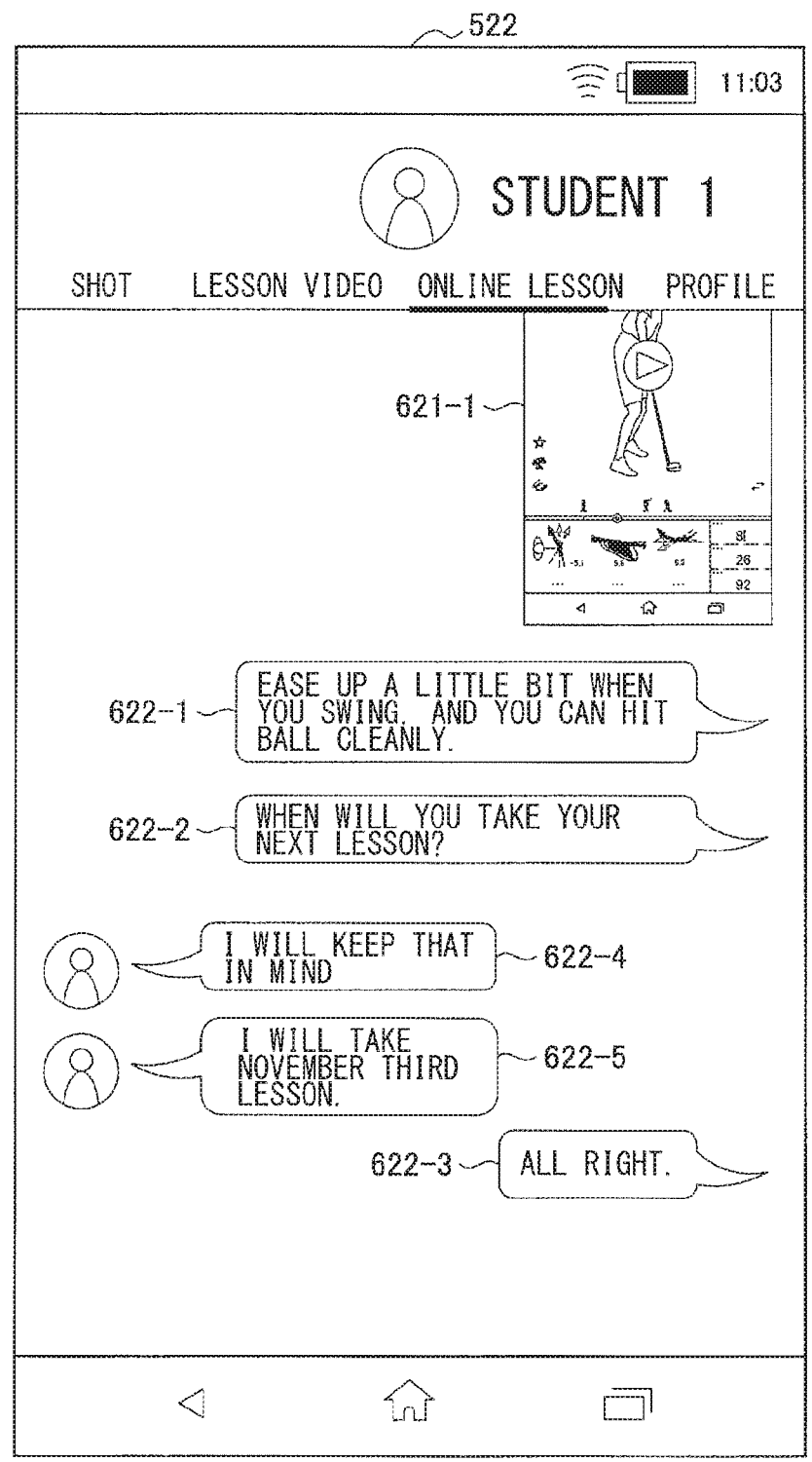

[ FIG. 14 ]
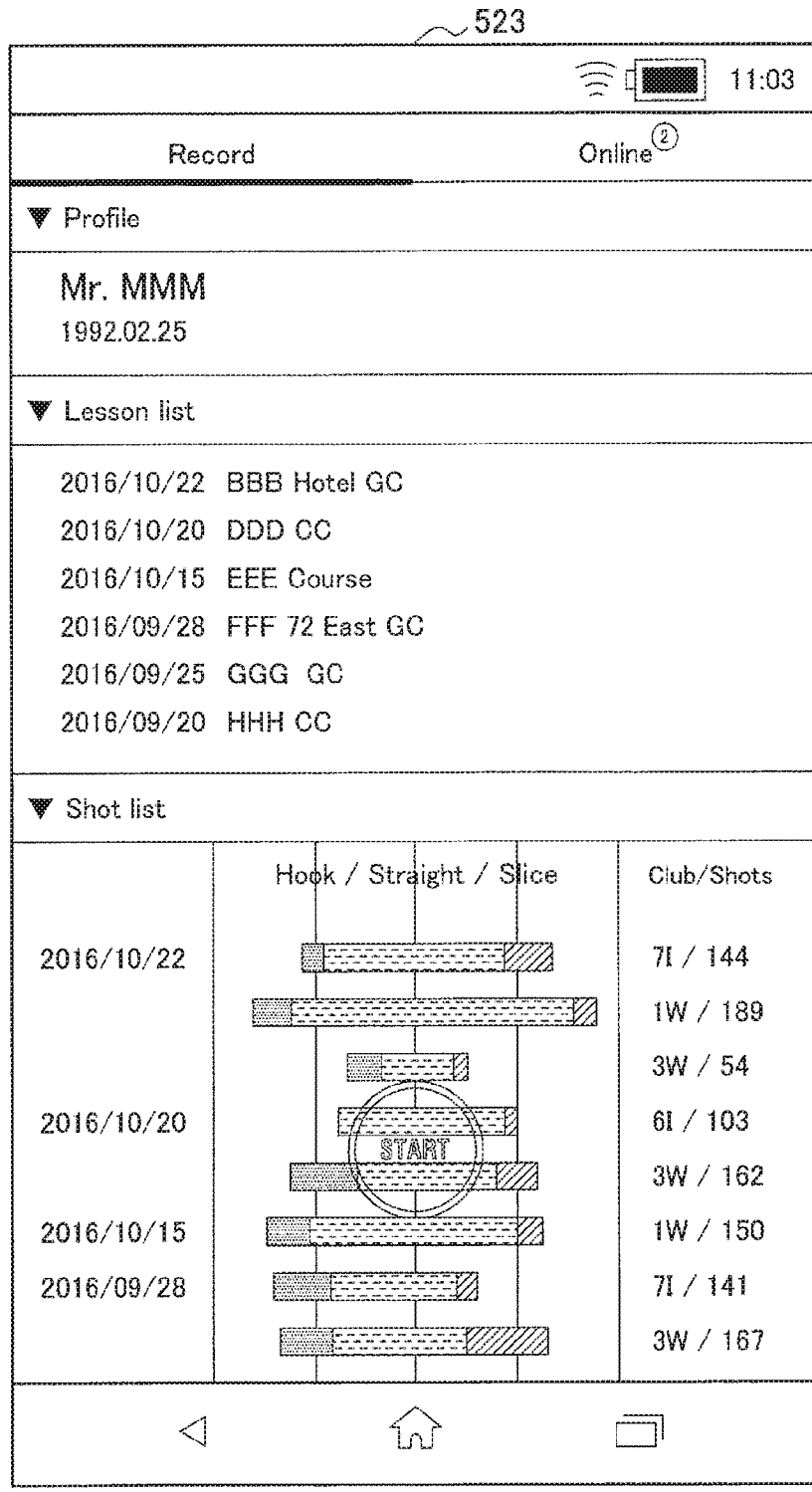

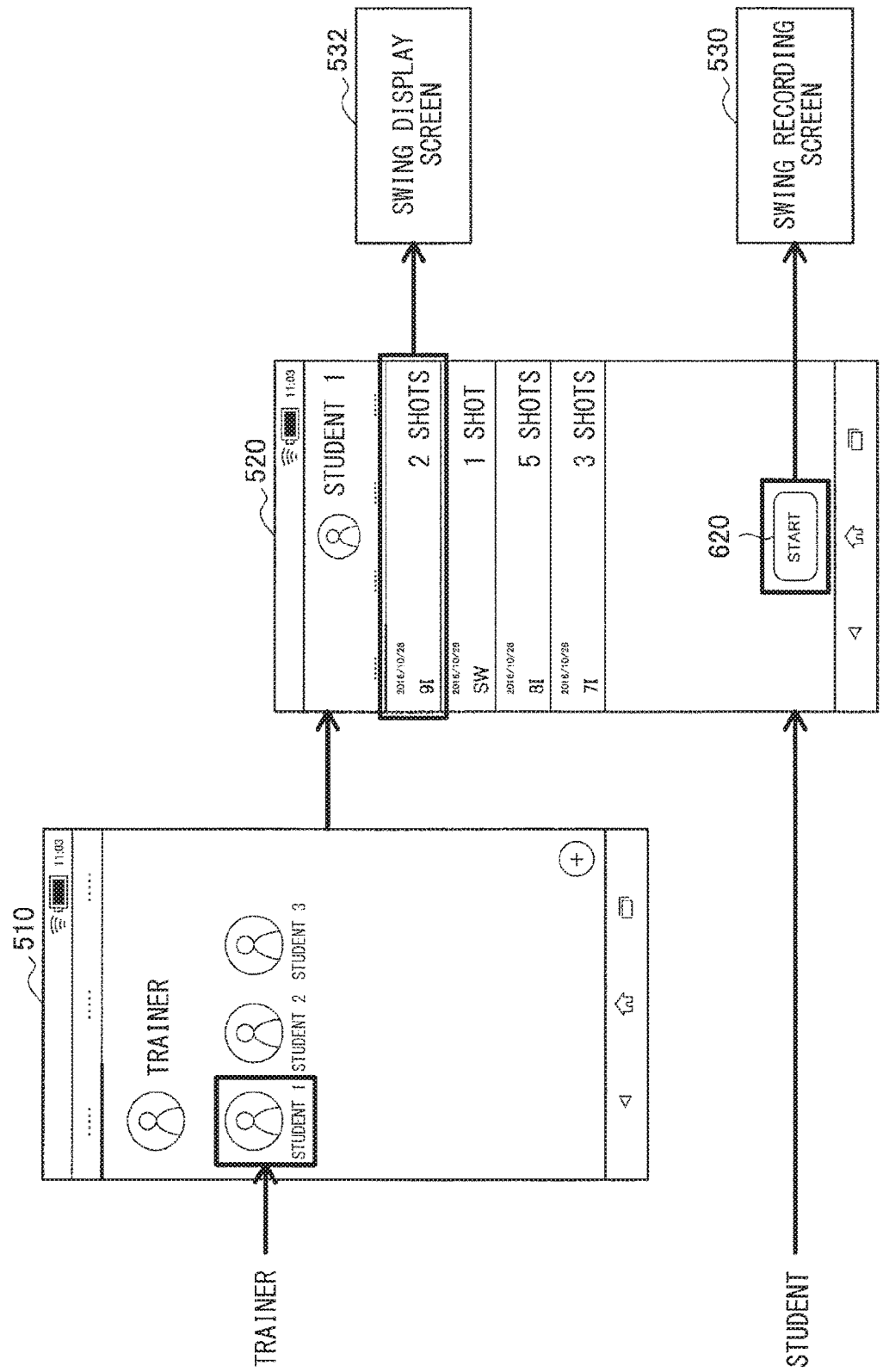

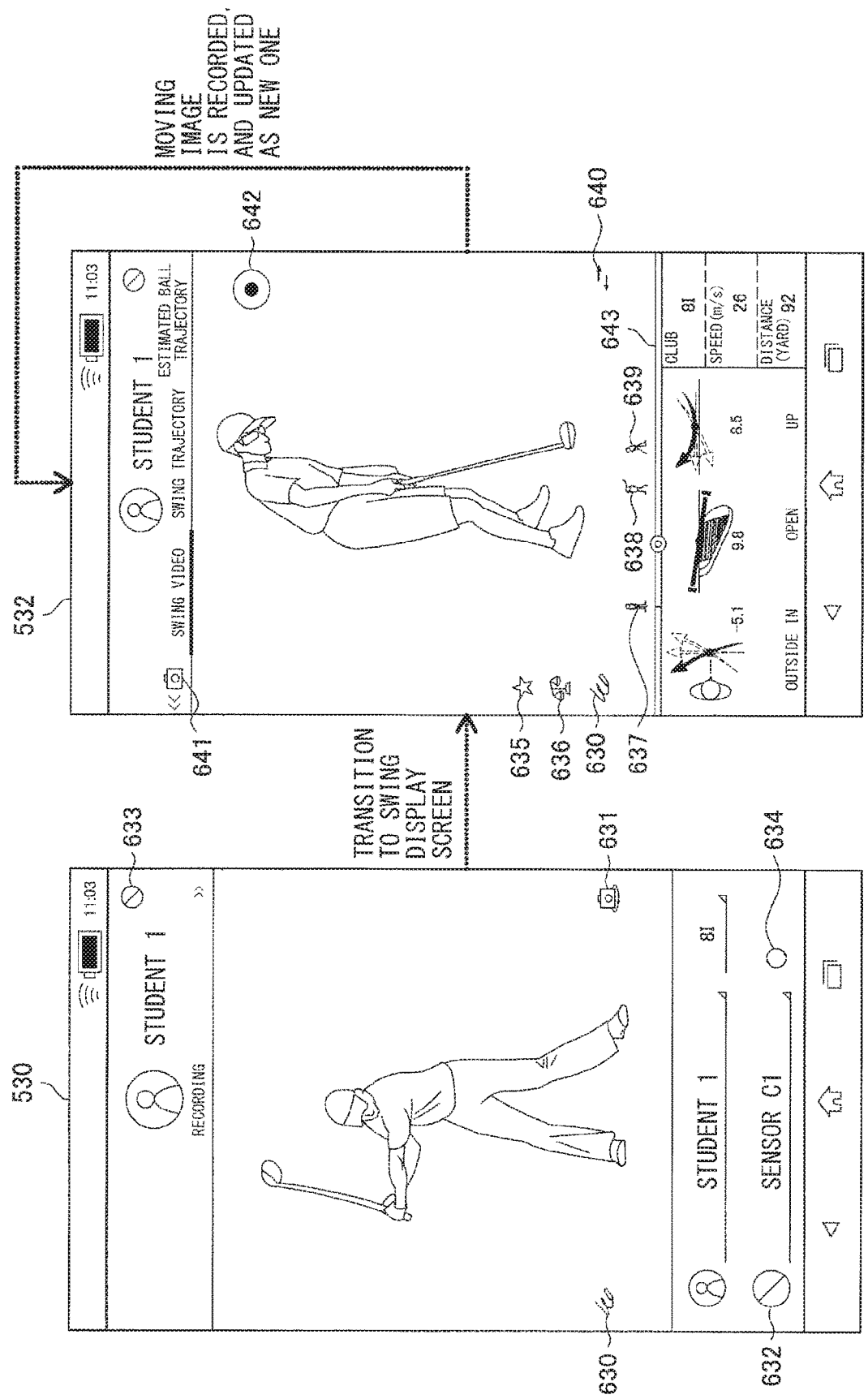
[FIG. 16]

[FIG. 17]
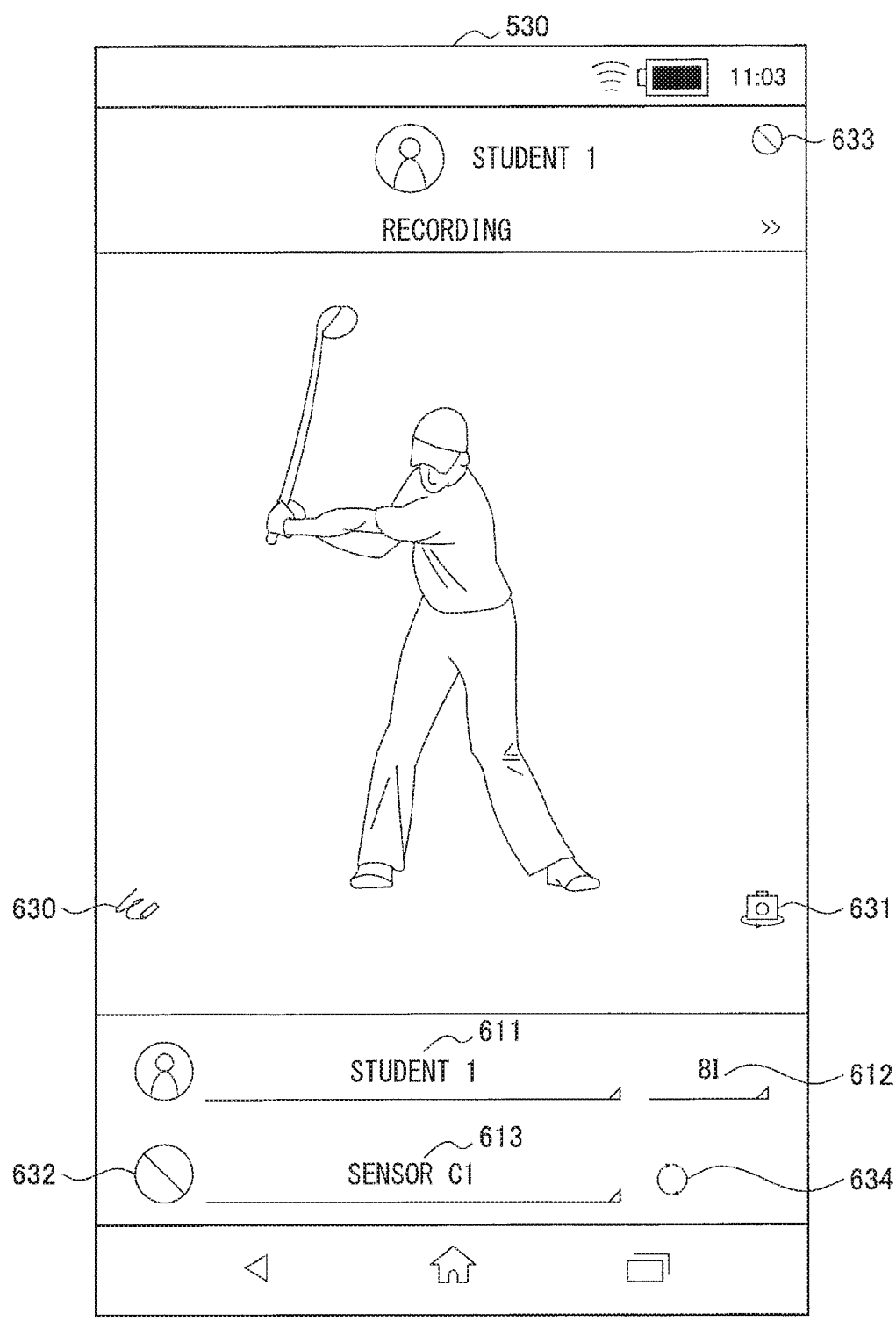

[ FIG. 18 ]
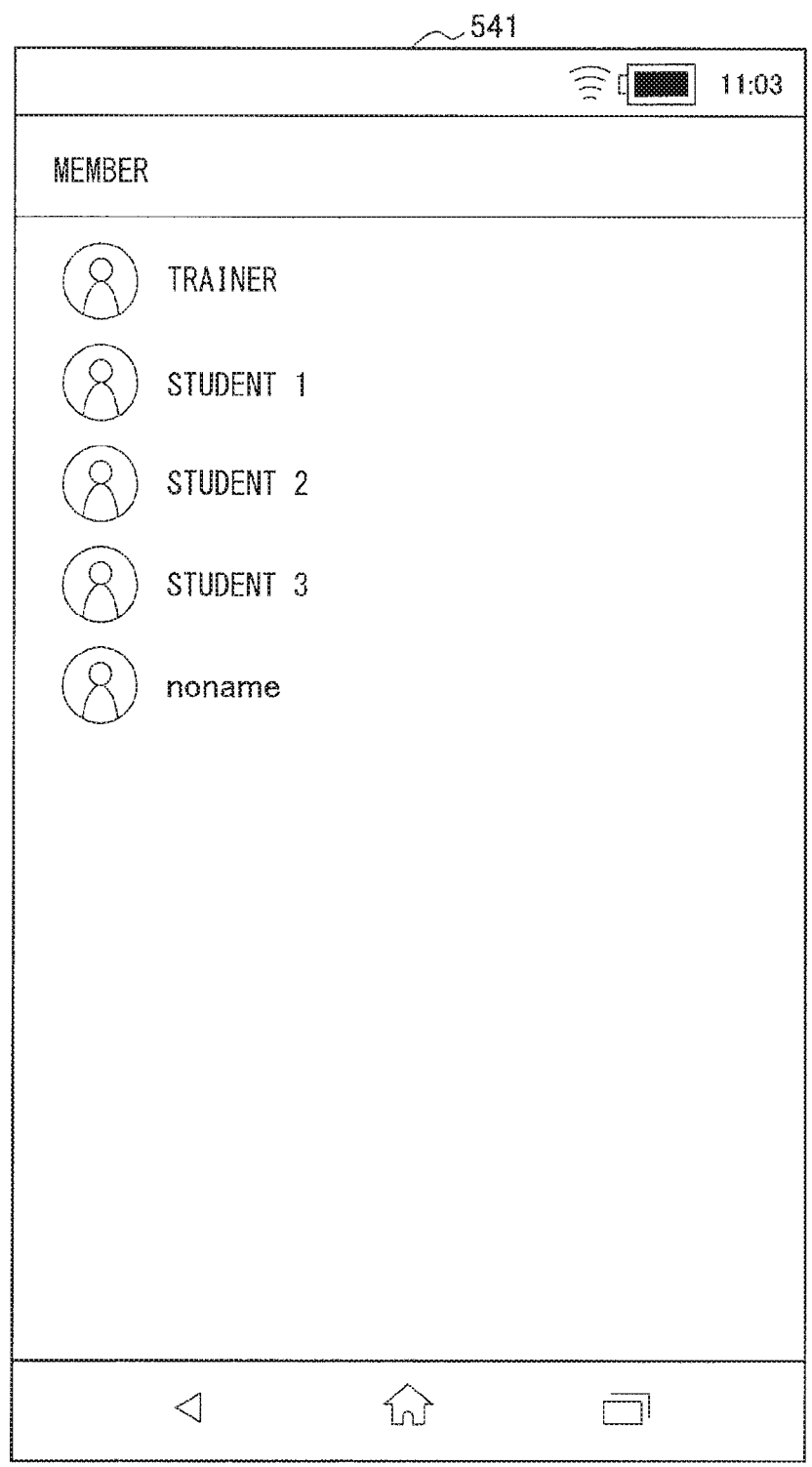

[FIG. 19]

[FIG. 20]
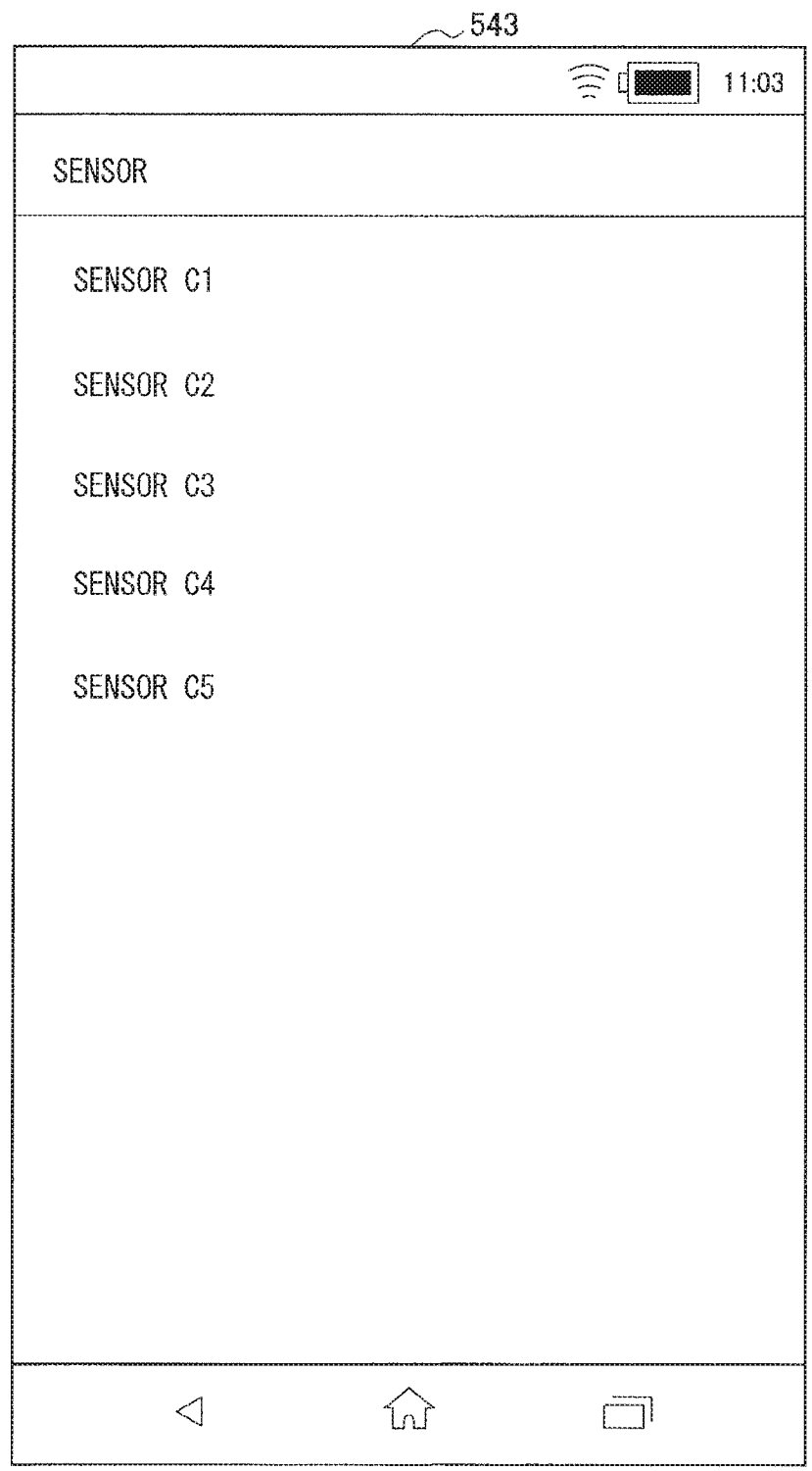

[FIG. 21]
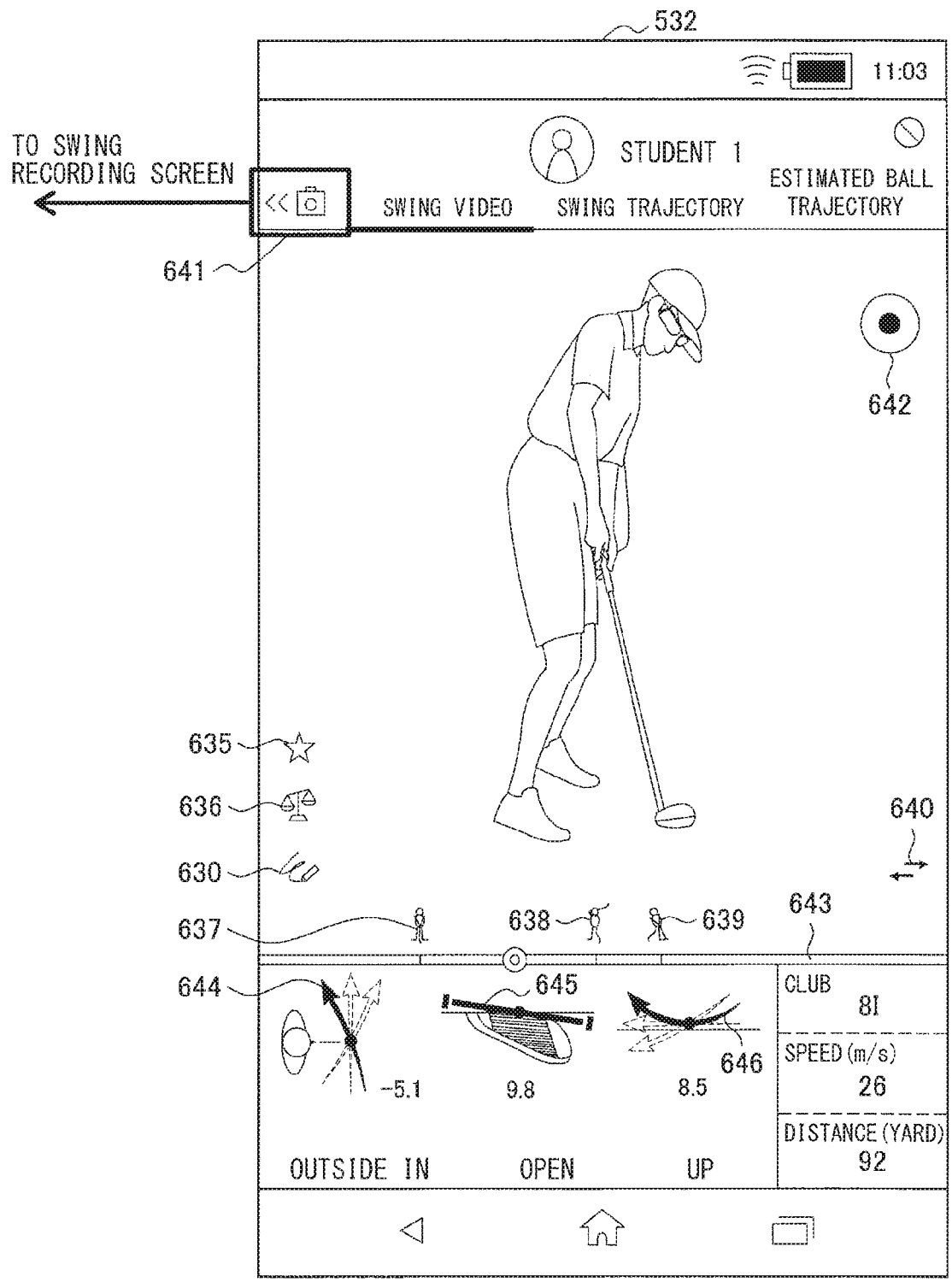

[FIG. 22]
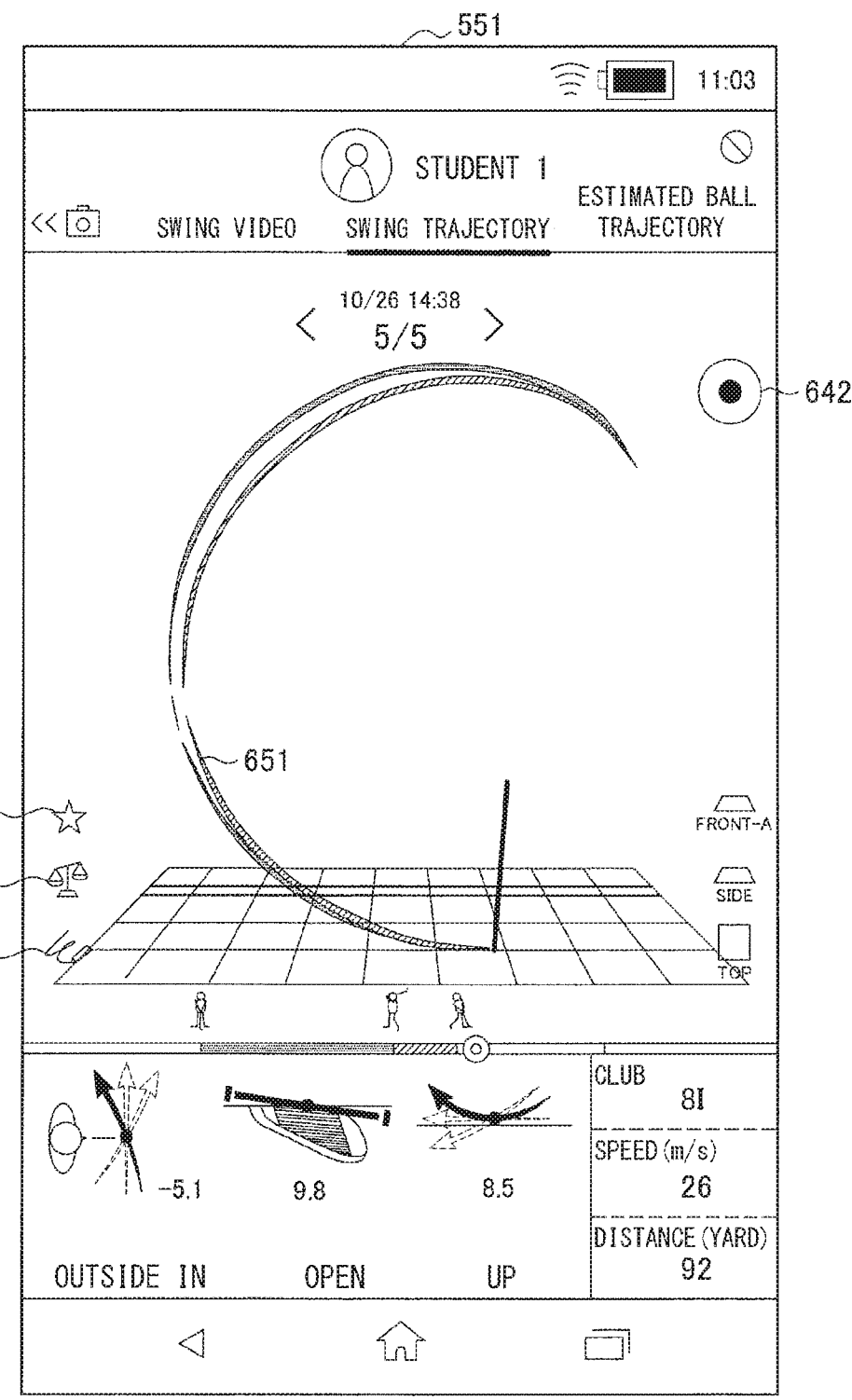

[FIG. 23]
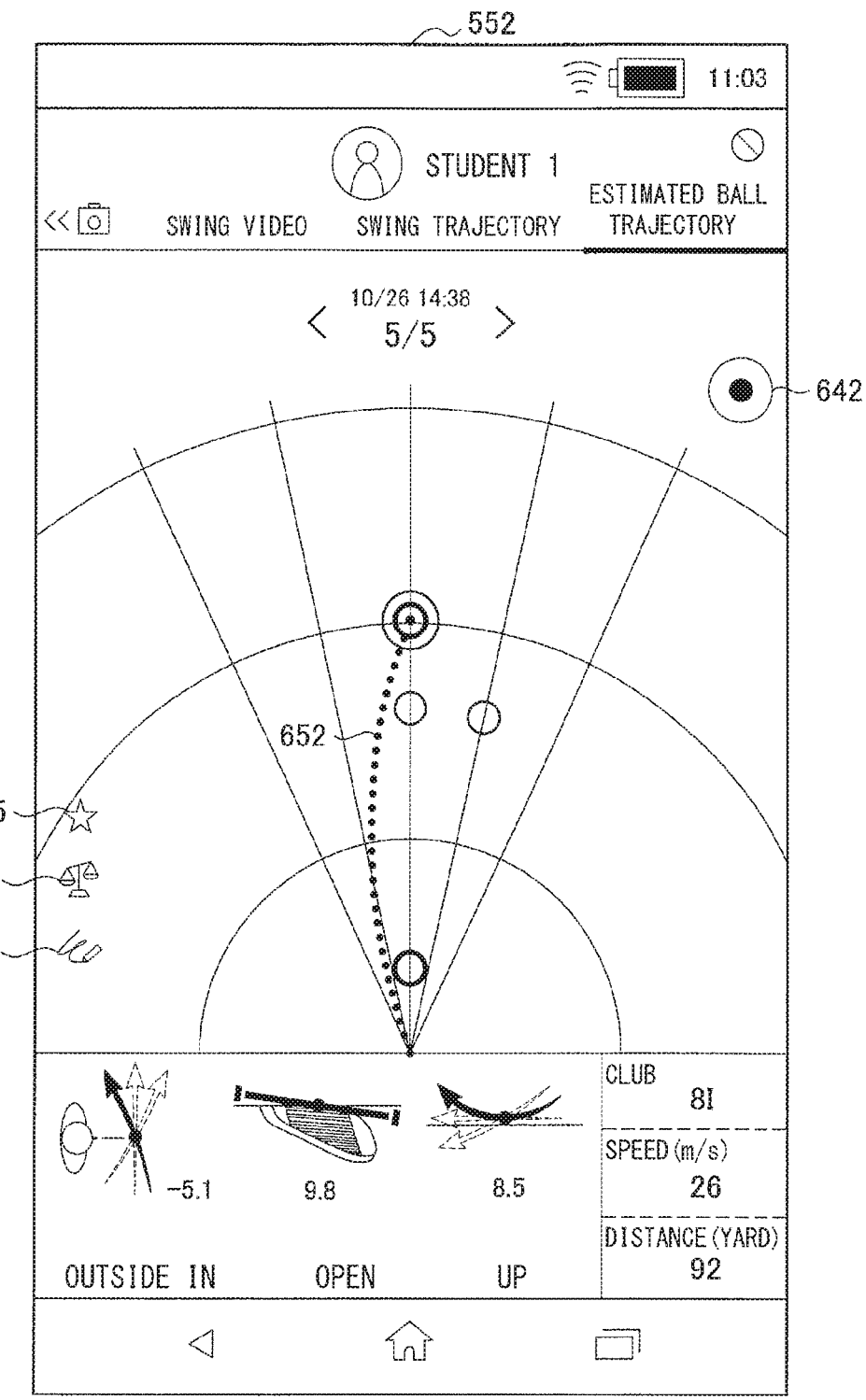

[FIG. 24]
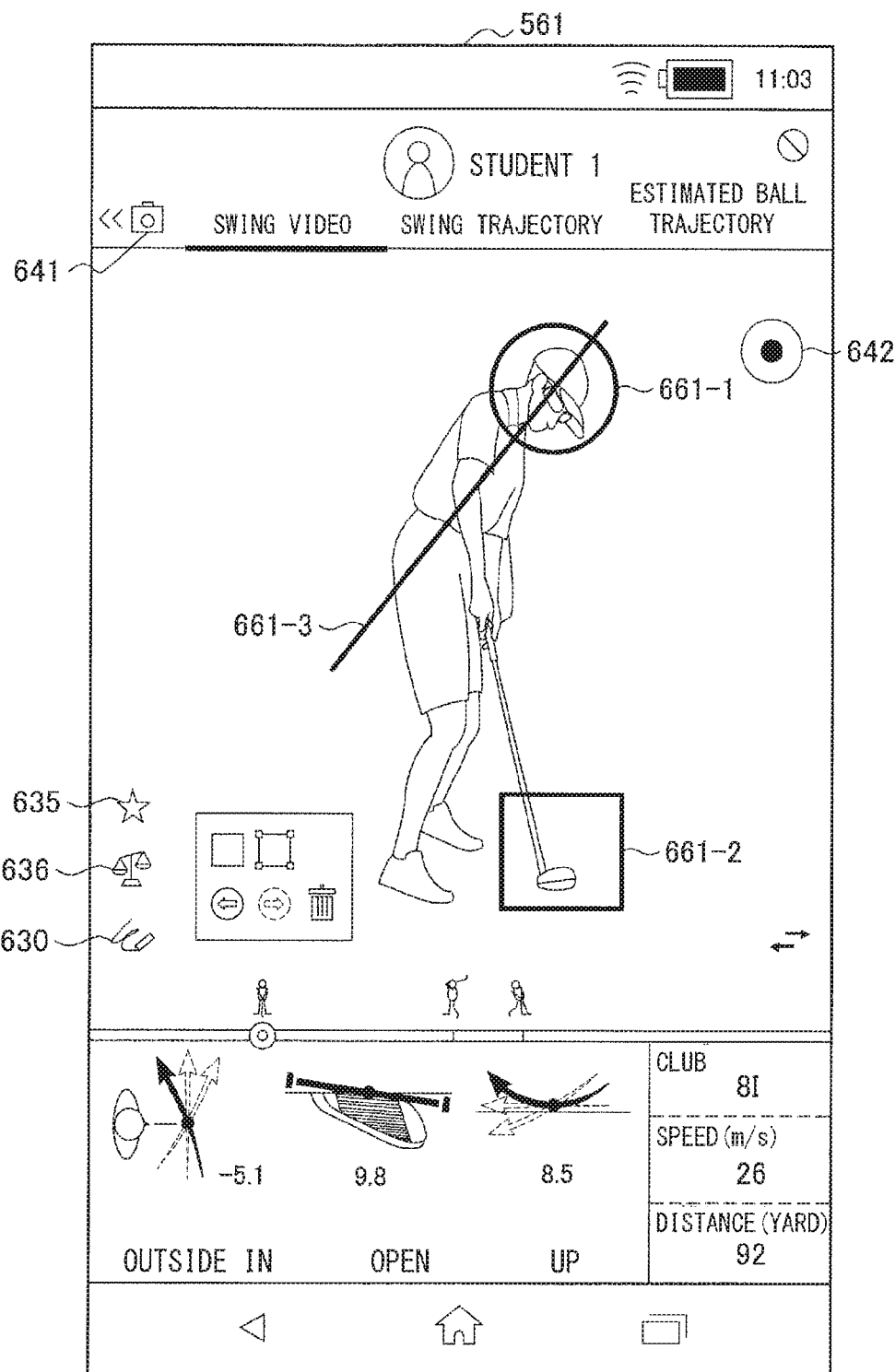

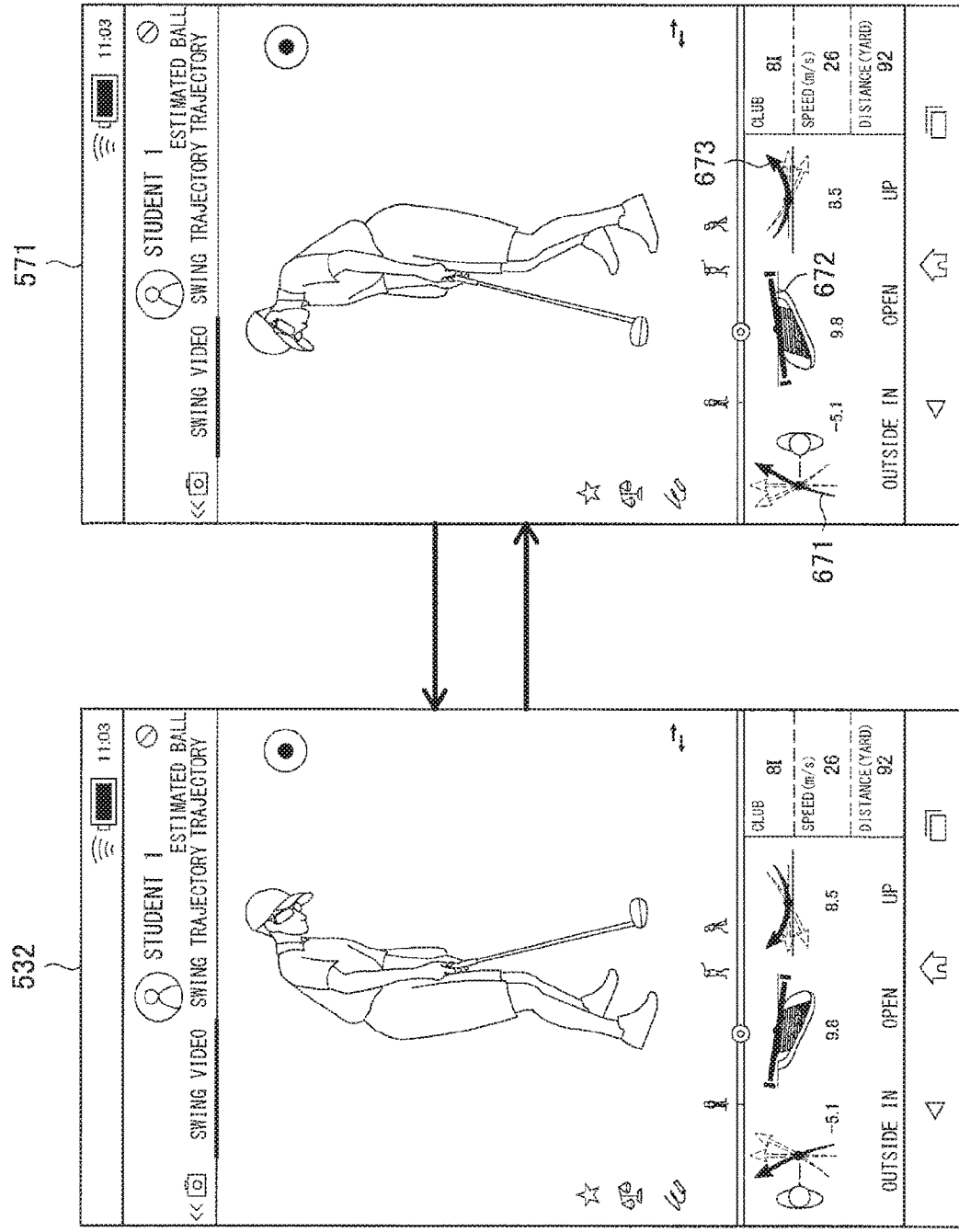
[FIG. 25]

[FIG. 26]
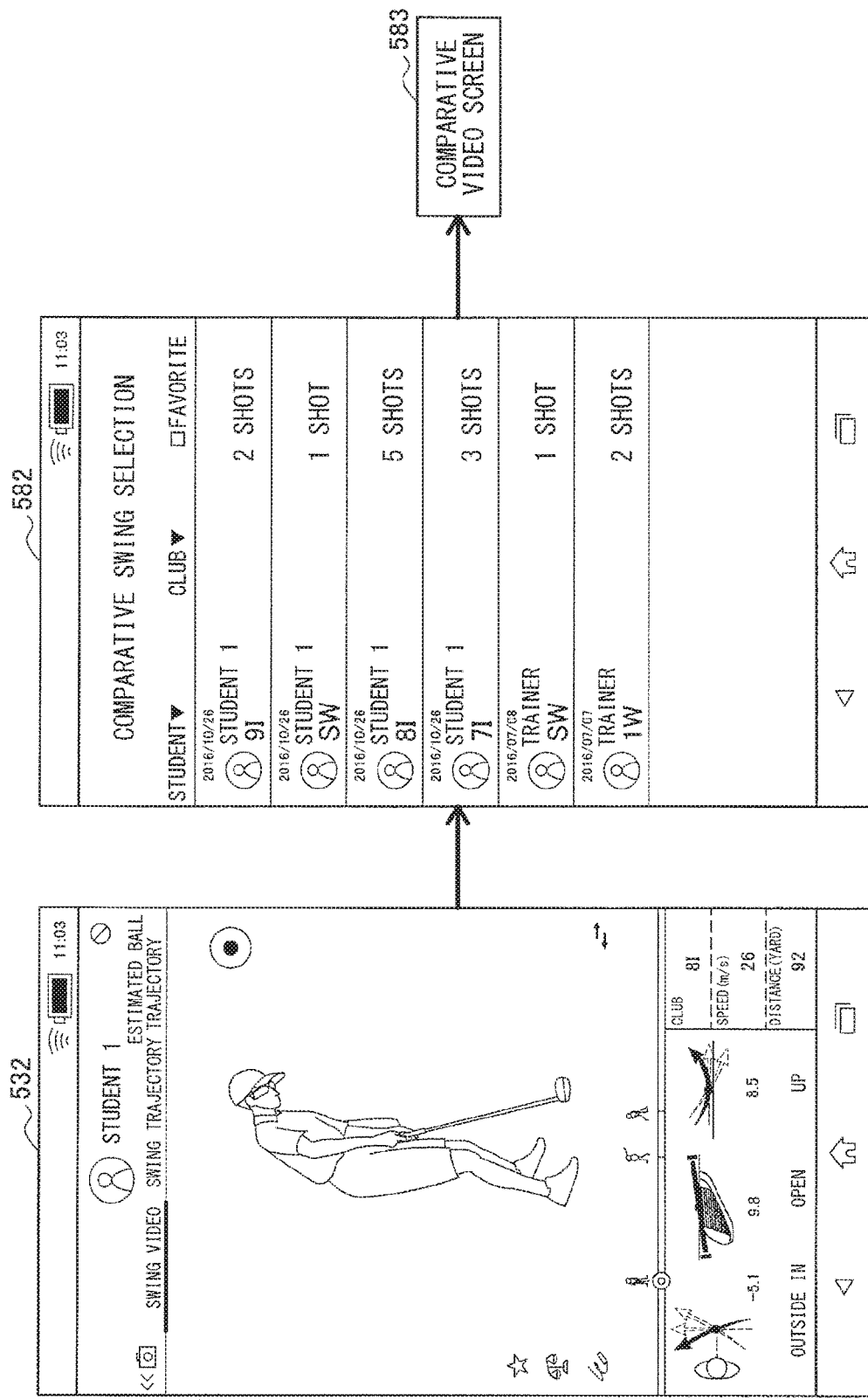

[FIG. 27]
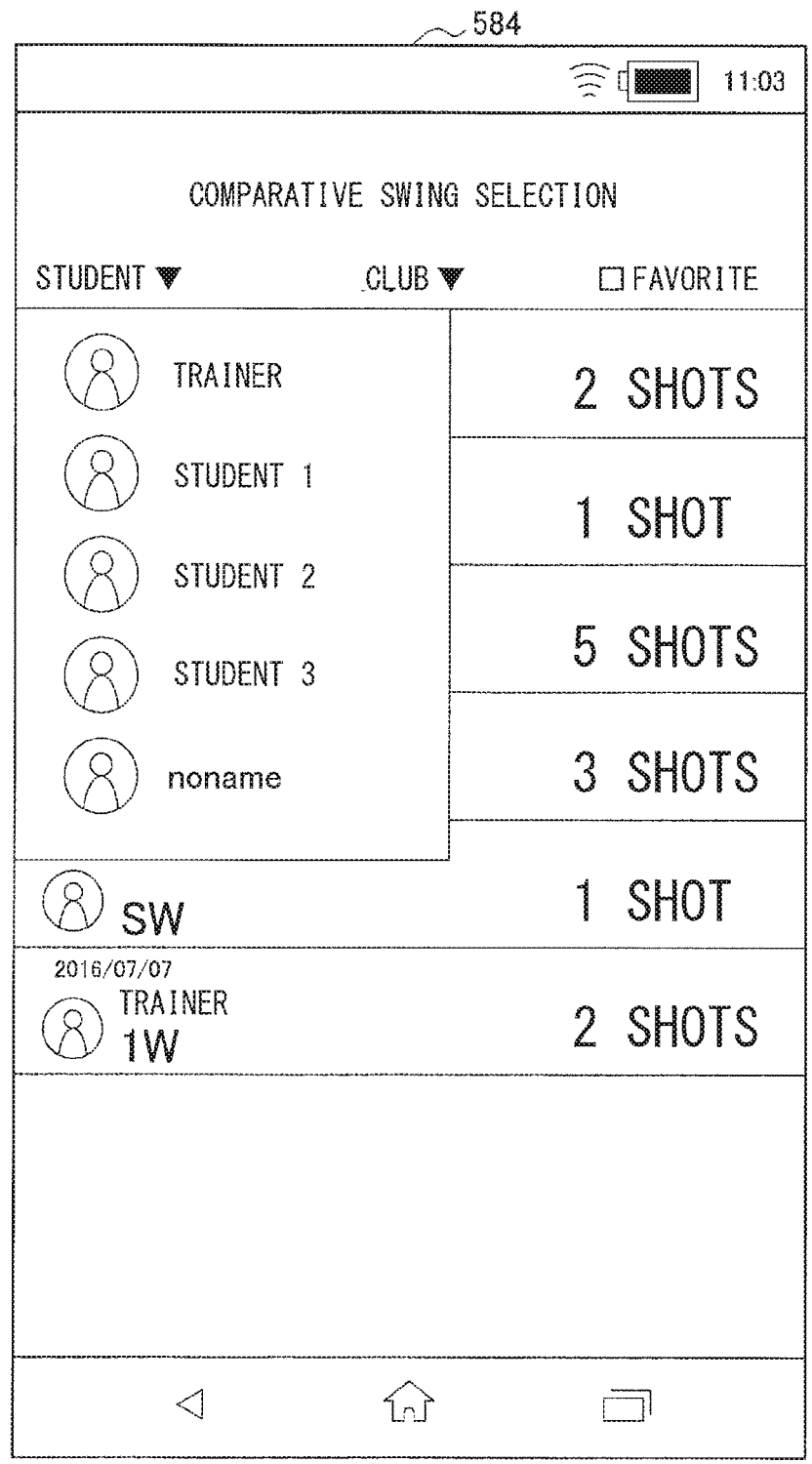

[FIG. 28]
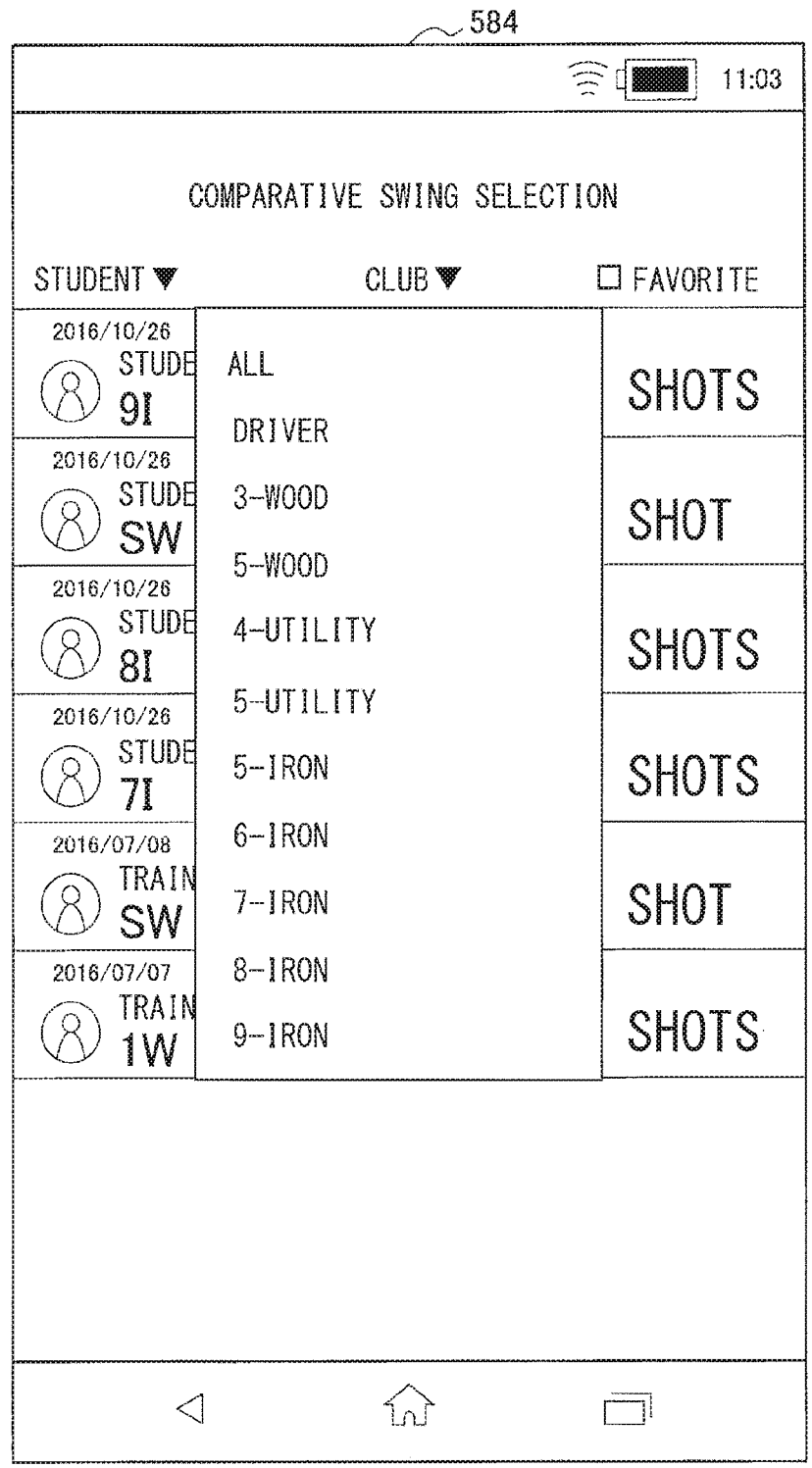

[FIG. 29]
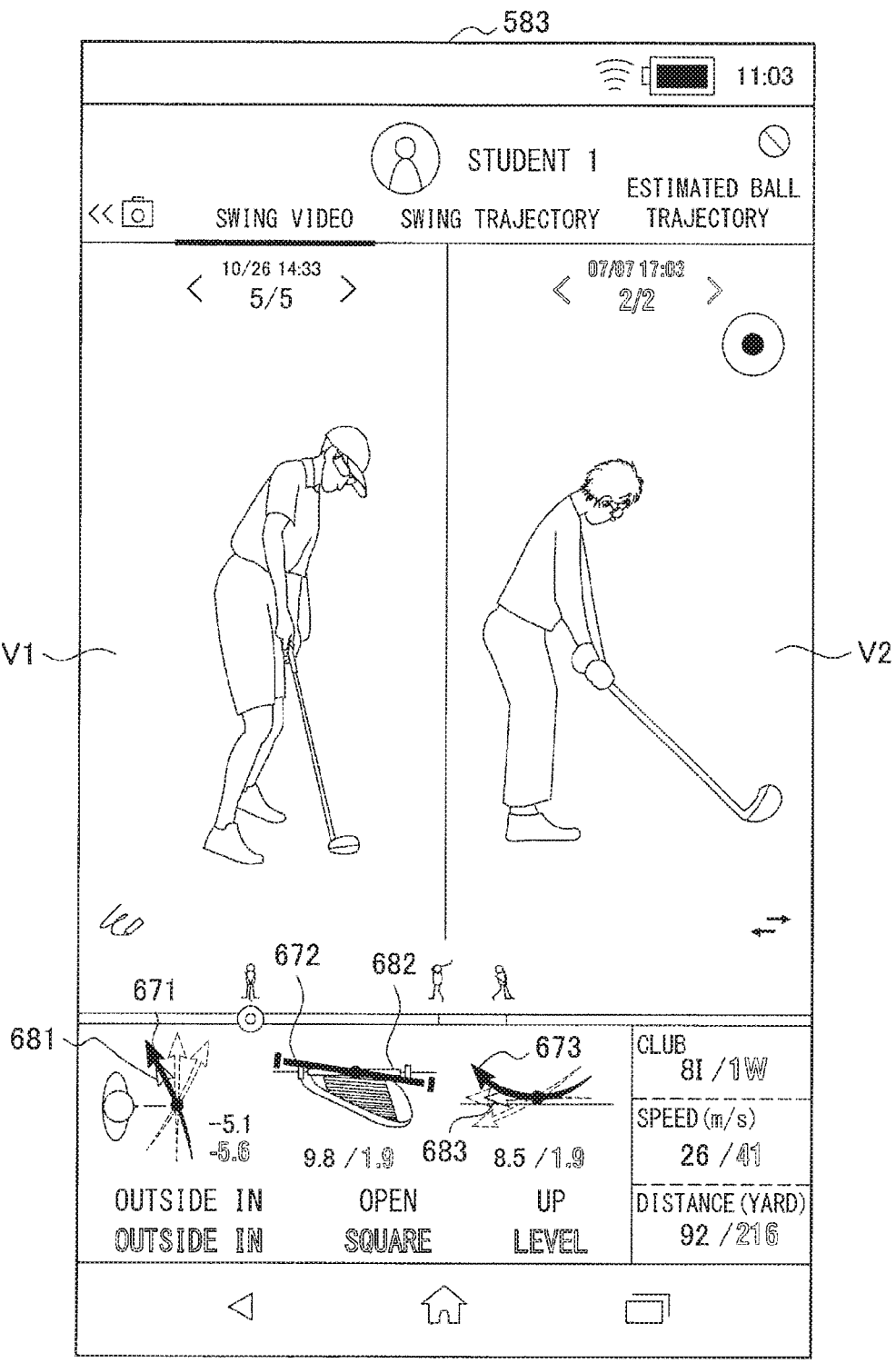

[FIG. 30]
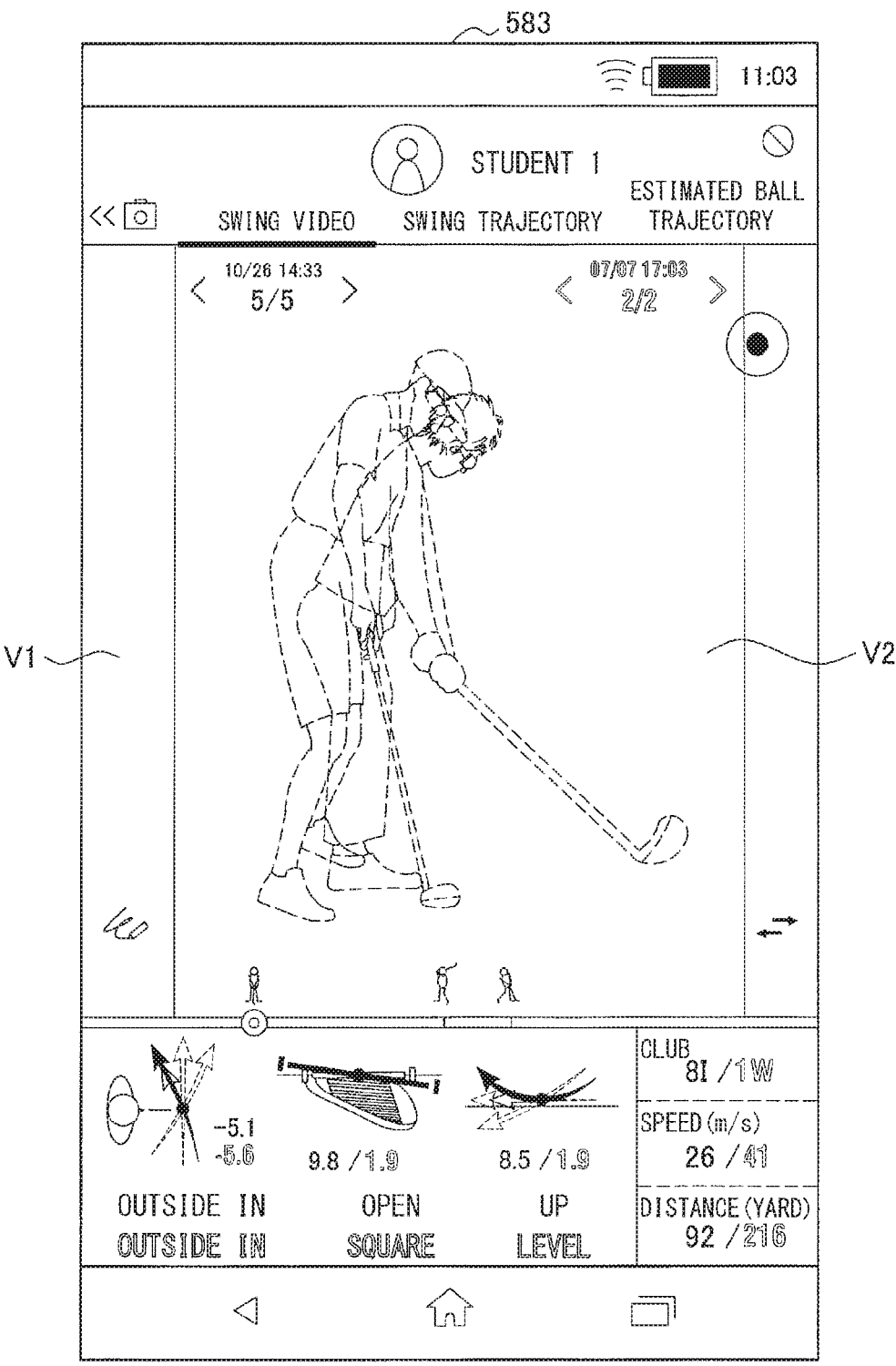

[FIG. 31]
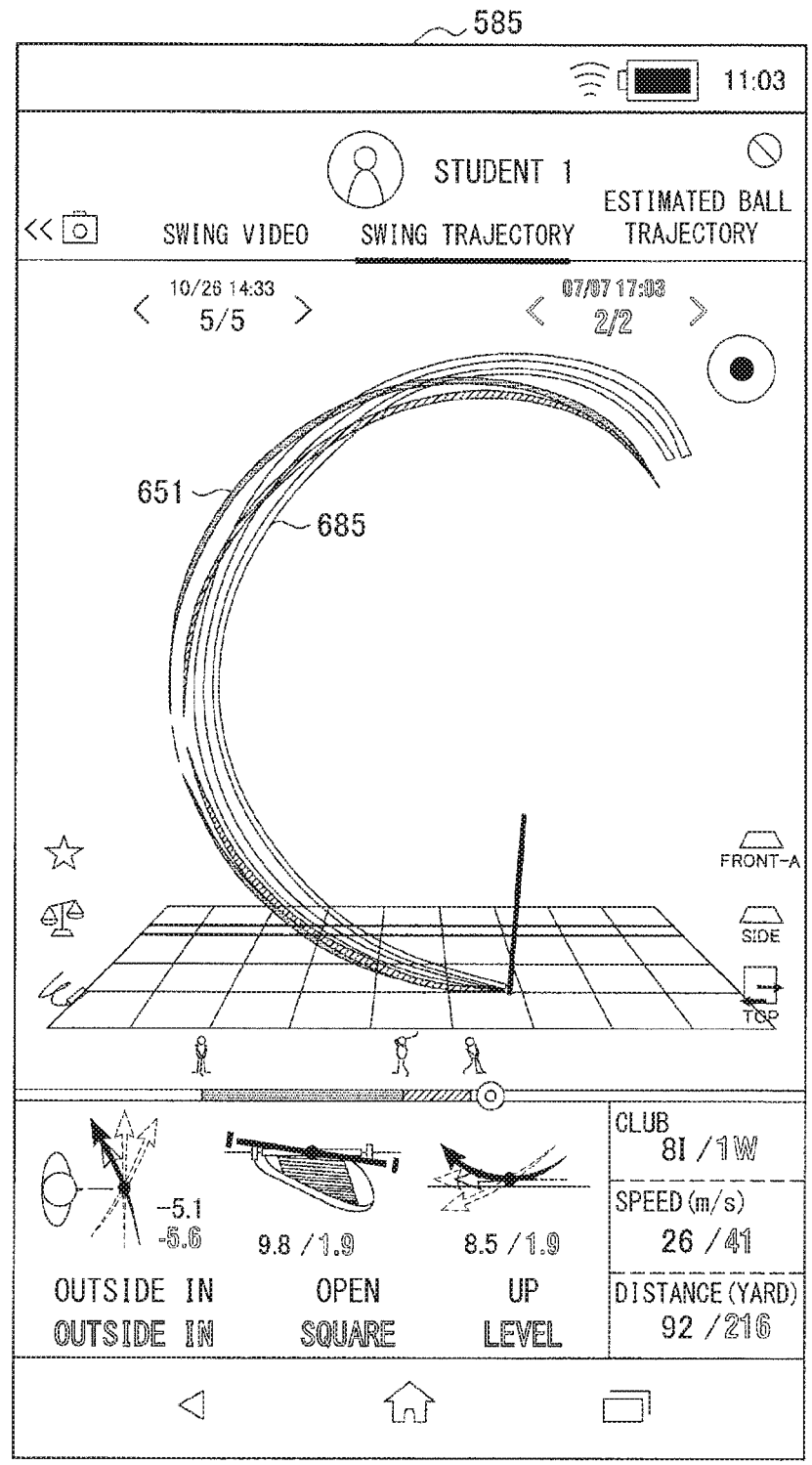

[FIG. 32]
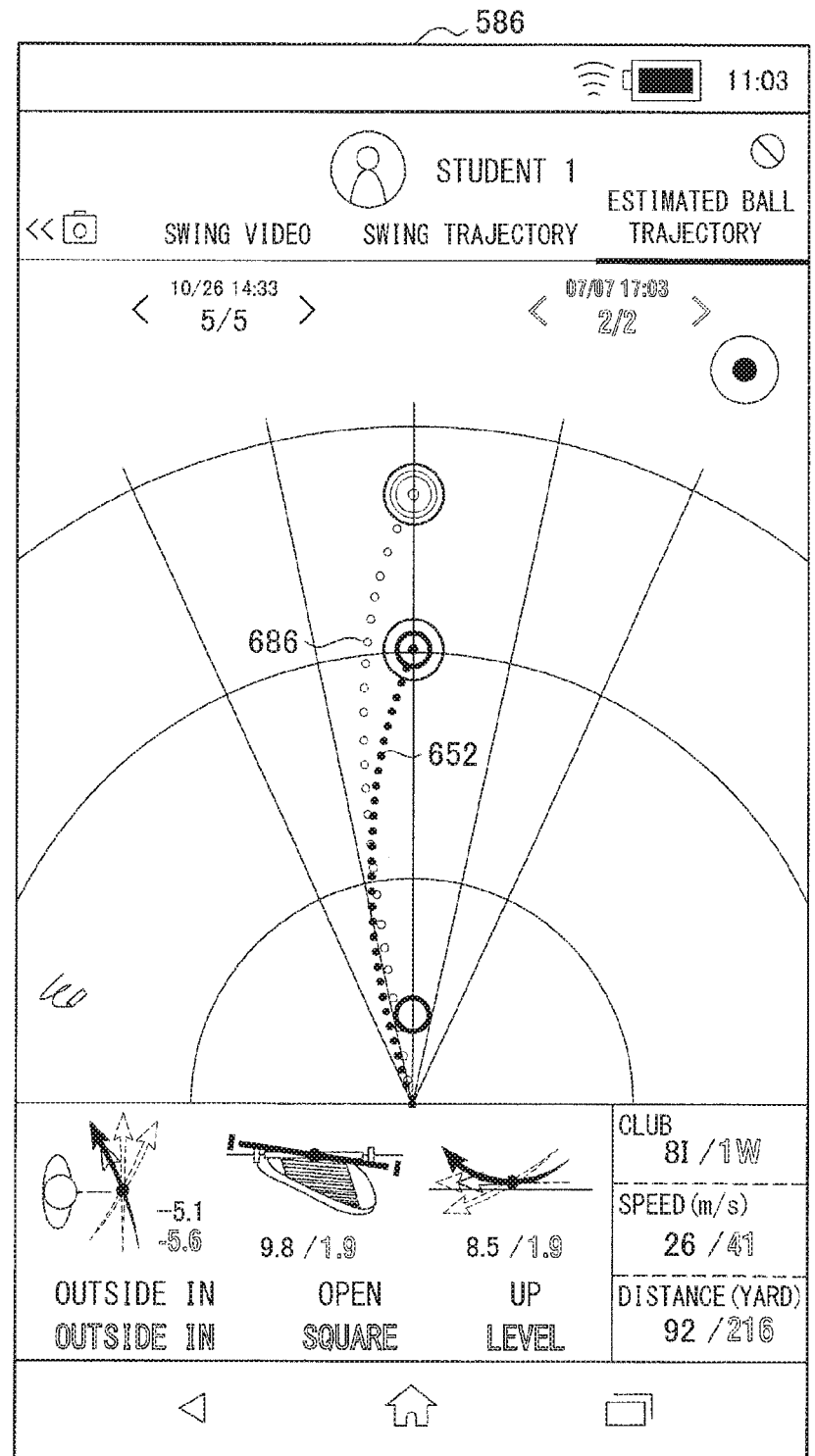

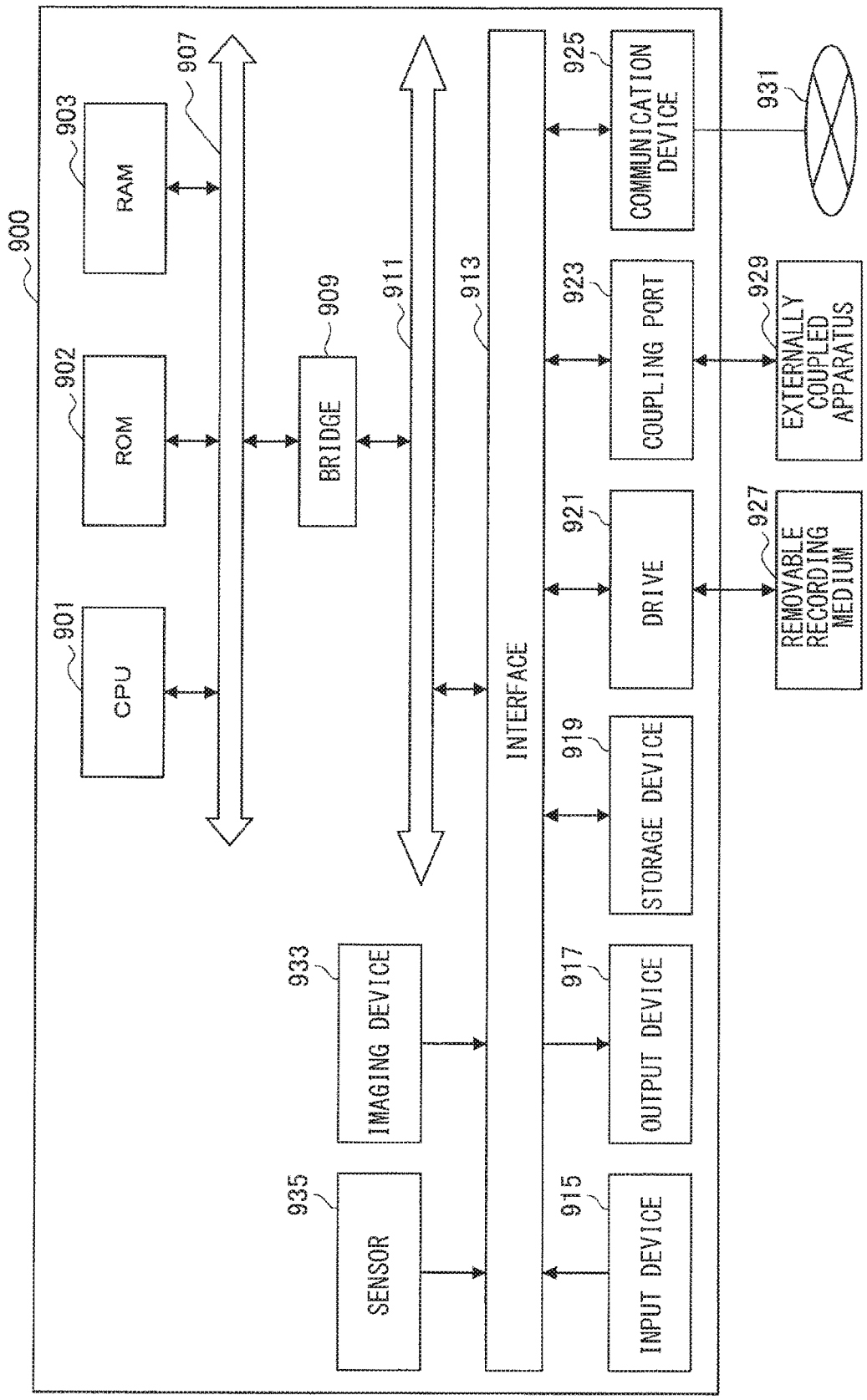
[FIG. 33]

INFORMATION PROCESSOR AND INFORMATION PROCESSING METHOD

CROSS REFERENCE TO RELATED APPLICATIONS

This application is a U.S. National Phase of International Patent Application No. PCT/JP2018/010434 filed on Mar. 16, 2018, which claims priority benefit of Japanese Patent Application No. JP 2017-110341 filed in the Japan Patent Office on Jun. 2, 2017. Each of the above-referenced applications is hereby incorporated herein by reference in its entirety.

TECHNICAL FIELD

The present disclosure relates to an information processor, an information processing method, and a program.

BACKGROUND ART

In recent years, a technique for accurately grasping a playing state of sports by a user has been disclosed. For example, a technique is disclosed in which occurrence of an event is detected on the basis of sensor information indicating a behavior of a user to generate event information corresponding to the event, and in which a scene is extracted from an image obtained by capturing an image of the user on the basis of the event information (see, e.g., PTL 1).

CITATION LIST

Patent Literature

PTL 1: Japanese Unexamined Patent Application Publication No. 2017-22727

SUMMARY OF THE INVENTION

Problem to be Solved by the Invention

However, there is a demand that a playing state of a first user be grasped by a second user who is different from the first user. In this situation, it is desired to provide a technique that makes it possible to efficiently present feedback information from the second user to the first user regarding the playing state of the first user.

Means for Solving the Problem

According to the present disclosure, there is provided an information processor including: an acquisition section that acquires feedback information regarding first generated information generated using a detected result of an event based on sensor information indicating information related to a first user who plays golf, from a terminal of a second user different from the first user; and a transmission control section that controls transmission of the feedback information to a terminal of the first user.

According to the present disclosure, there is provided an information processing method including: acquiring feedback information regarding first generated information generated using a detected result of an event based on sensor information indicating information related to a first user who plays golf from a terminal of a second user different from the first user; and controlling transmission of the feedback information to a terminal of the first user by a processor.

According to the present disclosure, there is provided a program that causes a computer to serve as an information processor. The information processor includes: an acquisition section that acquires feedback information regarding first generated information generated using a detected result of an event based on sensor information indicating information related to a first user who plays golf, from a terminal of a second user different from the first user; and a transmission control section that controls transmission of the feedback information to a terminal of the first user.

Effects of the Invention

As described above, according to the present disclosure, there is provided a technique that makes it possible to more efficiently present feedback information from the second user to the first user regarding a playing state of the first user. It is to be noted that the above-described effects are not necessarily limitative. In addition to or in place of the above effects, there may be achieved any of the effects described in the present specification or other effects that may be grasped from the present specification.

BRIEF DESCRIPTION OF THE DRAWINGS

FIG. 1 illustrates a configuration example of an information processing system according to an embodiment of the present disclosure.

FIG. 2 is a block diagram illustrating a functional configuration example of a server according to an embodiment of the present disclosure.

FIG. 3 is a block diagram illustrating a functional configuration example of a terminal according to an embodiment of the present disclosure.

FIG. 4 illustrates a sensor list constituting a sensor apparatus.

FIG. 5 illustrates a list of transmission data from the sensor apparatus to a partner paired with the sensor apparatus.

FIG. 6 illustrates an example of analysis data of data received by a pairing partner from the sensor apparatus.

FIG. 7 is an explanatory diagram of an example of screen transition in a case of signing in.

FIG. 8 illustrates an example of a trainer main screen displayed on a terminal.

FIG. 9 illustrates an example of a trainer screen in a group unit displayed on the terminal.

FIG. 10 illustrates an example of an online lesson selection screen displayed on the terminal.

FIG. 11 illustrates an example of a student main screen.

FIG. 12 illustrates an example of a lesson video screen.

FIG. 13 illustrates an example of an online lesson screen.

FIG. 14 illustrates an example of a profile screen.

FIG. 15 is an explanatory diagram of a flow from start of swing display to start of swing recording.

FIG. 16 illustrates an example of a swing recording screen.

FIG. 17 illustrates an example of the swing recording screen.

FIG. 18 illustrates an example of a member selection screen.

FIG. 19 illustrates an example of a club selection screen.

FIG. 20 illustrates an example of a sensor selection screen.

FIG. 21 illustrates an example of a swing display screen.

FIG. 22 illustrates an example of a swing trajectory screen.

FIG. 23 illustrates an example of an estimated ball trajectory screen.

FIG. 24 illustrates an example of a swing display screen.

FIG. 25 is an explanatory diagram of 180-degree inversion display of first generated information (swing video and analysis data) with respect to an axis.

FIG. 26 is an explanatory diagram of selection of a swing of a comparative partner.

FIG. 27 illustrates an example of a comparative swing selection screen.

FIG. 28 illustrates an example of the comparative swing selection screen.

FIG. 29 illustrates an example in which two pieces of generated information are displayed side by side on the same screen.

FIG. 30 illustrates an example in which the two pieces of generated information are displayed in a superimposed manner on the same screen.

FIG. 31 illustrates an example of a comparative swing trajectory screen.

FIG. 32 illustrates an example of a comparative estimated ball trajectory screen.

FIG. 33 is a block diagram illustrating an example of a hardware configuration of the server according to the embodiment.

MODES FOR CARRYING OUT THE INVENTION

Description is given below in detail of preferred embodiments of the present disclosure with reference to attached drawings. It is to be noted that, in the present specification and drawings, repeated description is omitted for components substantially having the same functional configuration by assigning the same reference numerals.

In addition, there is a case where, in the present specification and drawings, a plurality of components having substantially the same or similar functional configurations may be distinguished by assigning different numbers that follow the same reference numerals. However, in a case where it is unnecessary to particularly distinguish among a plurality of components having substantially the same or similar functional configurations, only the same reference numerals are assigned. In addition, there may be a case where similar components of different embodiments may be distinguished by assigning different alphabets that follow the same reference numerals. However, in a case where it is unnecessary to particularly distinguish among similar components, only the same reference numerals are assigned.

It is to be noted that description is given in the following order.

0. Overview
1. Embodiment of Present Disclosure
    1.1. Functional Configuration Example of Server
    1.2. Functional Configuration Example of Terminal
    1.3. Detailed Function of Information Processing System
        1.3.1. Examples of Various data
        1.3.2. Sign In
        1.3.3 Trainer Main Screen
        1.3.4. Student Main Screen
        1.3.5. Flow from Start of Swing Display to Start of Swing Recording
        1.3.6. Swing Recording
        1.3.7. Swing display
    1.4. Hardware Configuration Example
2. Closing

0. Overview

FIG. 1 illustrates a configuration example of an information processing system according to an embodiment of the present disclosure. As illustrated in FIG. 1, an information processing system 1 according to an embodiment of the present disclosure includes a server 10, a terminal 20-1, a terminal 20-2, and a sensor apparatus 30. The server 10, the terminal 20-1, and the terminal 20-2 are coupled to a network, and are configured to be able to communicate with one another via the network.

The server 10 is configured by a computer, and is configured to be able to communicate with the terminal 20-1 and the terminal 20-2 via the network. Further, in a case where another terminal is coupled to the network, the server 40 is able to communicate with the other terminal as well via the network. It is to be noted that the server 10 may serve as an information processor.

The terminal 20-1 is used by a first user. In the present embodiment, description is given mainly of an example in which the first user is a student who receives a sports lesson from a second user. However, the first user is not limited to such an example.

It is to be noted that, in the present embodiment, description is given mainly of a case where the terminal 20-1 is a smartphone. However, the terminal 20-1 is not limited to a smart phone. For example, the terminal 20-1 may be a mobile phone, a tablet terminal, or an imaging device. The imaging device may be a digital camera, or the like. The terminal 20-1 may also serve as an information processor.

The terminal 20-2 is used by the second user who is different from the first user. In the present embodiment, description is given mainly of an example in which the second user is a trainer who teaches golf to the first user in a lesson. However, the second user is not limited to such an example.

It is to be noted that, in the present embodiment, description is given mainly of a case where the terminal 20-2 is a smartphone. However, the terminal 20-2 is not limited to a smart phone. For example, the terminal 20-2 may be a mobile phone, a tablet terminal, or an imaging device. The imaging device may be a digital camera, or the like. The terminal 20-2 may also serve as an information processor.

Further, in the present embodiment, description is given, taking golf as an example of sports. However, sports applicable to the present embodiment is not limited to golf. For example, the sports may be any one of baseball, tennis, table tennis, lacrosse, hockey, squash, and badminton.

The sensor apparatus 30 is attached to a club to be used when playing golf. However, a position to which the sensor apparatus 30 is attached is not limited to a club. For example, the sensor apparatus 30 may be attached to a user himself or herself who plays golf. In addition, in a case where the above-mentioned sport other than golf is played, the sensor apparatus 30 may be attached to various tools (e.g., a racquet, a bat, and the like) to be used by a user instead of the club. In the present embodiment, description is given mainly of an example in which the sensor apparatus 30 is attached to a club to be used when a student plays golf.

The sensor apparatus 30 is configured to be able to perform wireless communication with a pairing partner. For example, in a case where pairing is performed with the terminal 20-1 to be used by the student, the sensor apparatus 30 is able to perform wireless communication with the terminal 20-1. Meanwhile, in a case where pairing is performed with the terminal 20-2 to be used by the trainer, the sensor apparatus 30 is able to perform wireless communication with the terminal 20-2.

Here, there is a request for a trainer to grasp a playing state of a student. Therefore, in the present embodiment, description is given mainly of a technique that makes it possible to more efficiently present feedback information from the trainer to the student regarding the playing state of the student.

Description has been given hereinabove of the overview of an embodiment of the present disclosure.

1. Embodiment of Present Disclosure

[1.1. Example of Functional Configuration of Server]

Next, description is given of a functional configuration example of the server 10 according to an embodiment of the present disclosure. FIG. 2 is a block diagram illustrating a functional configuration example of the server 10 according to an embodiment of the present disclosure. As illustrated in FIG. 2, the server 10 includes a control section 110, a storage section 130, and a communication section 140. These functional blocks included in the server 10 are described below.

The control section 110 may be configured by a processing unit such as one or a plurality of CPUs (Central Processing Unit; central processing unit), for example. In a case where these blocks are configured by the processing unit such as the CPU, such a processing unit may be configured by an electronic circuit. The control section 110 includes an acquisition section 112, a calculation section 113, and a transmission control section 114. These blocks are described in detail later.

The storage section 130 includes a memory, and is a recording device that stores a program to be executed by the control section 110 or that stores data necessary for executing the program. In addition, the storage section 130 temporarily stores data for operation to be performed by the control section 110. It is to be noted that the storage section 130 may be a magnetic storage section device, a semiconductor storage device, an optical storage device, or a magneto-optical storage device.

The communication section 140 includes a communication circuit, and has a function of communicating with another apparatus via the network. For example, the communication section 140 is configured by a communication interface. For example, the communication section 140 is able to communicate with the terminal 20-1 and with the terminal 20-2 via the network.

Description has been given hereinabove of the functional configuration example of the server 10 according to an embodiment of the present disclosure.

[1.2. Functional Configuration Example of Terminal]

Next, description is given of a functional configuration example of a terminal 20 according to an embodiment of the present disclosure. FIG. 3 is a block diagram illustrating a functional configuration example of the terminal 20 according to an embodiment of the present disclosure. As illustrated in FIG. 3, the terminal 20 includes a control section 210, an operating section 220, an imaging section 225, a storage section 230, a communication section 240, and an output section 250. These functional blocks included in the terminal 20 are described below.

The control section 210 may be configured by a processing unit such as one or a plurality of CPUs (Central Processing Unit; central processing unit), for example. In a case where these blocks are configured by the processing unit such as the CPU, such a processing unit may be configured by an electronic circuit.

The operating section 220 has a function of accepting an input of an operation to be performed by a user. In the present embodiment, description is given mainly of a case where the operating section 220 is configured by a touch panel. However, the operating section 220 is not limited to the touch panel. For example, the operating section 220 may include a mouse, a keyboard, a switch, a lever, and the like. In addition, the operating section 220 may include a microphone that detects a voice of the user.

The imaging section 225 includes one or a plurality of image sensors, and obtains a moving image by capturing an image of the user who plays golf. The moving image captured by the imaging section 225 is outputted to the control section 210.

The storage section 230 includes a memory, and is a recording device that stores a program to be executed by the control section 210 and that stores data necessary for executing the program. In addition, the storage section 230 temporarily stores data for operation to be performed by the control section 210. It is to be noted that the storage section 230 may be a magnetic storage section device, a semiconductor storage device, an optical storage device, or a magneto-optical storage device.

The communication section 240 includes a communication circuit, and has a function of communicating with another device via the network. For example, the communication section 240 is configured by a communication interface. For example, the communication section 240 is able to communicate with the server 10 via the network. In addition, the communication section 240 performs wireless communication with the sensor apparatus 30.

The output section 250 outputs various types of information. For example, the output section 250 may include a display that allows for user-visible displaying, and the display may be a liquid crystal display or an organic EL (Electro-Luminescence) display. In addition, the output section 250 may include an audio output device such as a speaker. Alternatively, the output section 250 may include a tactile sensation presentation device that presents tactile sensation to a user.

Description has been given hereinabove of the functional configuration example of the terminal 20 according to an embodiment of the present disclosure.

[1.3. Detailed Function of Information Processing System]

Next, description is given of a detailed function of the information processing system 1 according to an embodiment of the present disclosure. In the embodiment of the present disclosure, the acquisition section 112 in the server 10 acquires, from the terminal 20-2 of the trainer, feedback information regarding first generated information generated using a detected result of an event based on sensor information indicating information related to a student who plays golf. Further, the transmission control section 114 controls transmission of the feedback information to the terminal 20-1 of the student.

Such a configuration makes it possible to more efficiently present the feedback information from the trainer to the student regarding the playing state of the student.

It is to be noted that, the present embodiment assumes a case where the sensor apparatus 30 is attached to the club, and thus the sensor information is detected by the sensor apparatus 30 attached to the student. However, in a case where the sensor apparatus 30 is attached to the club, the sensor information may be detected by the sensor apparatus 30 attached to the club.

In addition, in the present embodiment, description is given, as an example of the generated information, mainly of a case including a "swing video" extracted on the basis of the detected result of the event and "analysis data" obtained on the basis of the detected result of the event. However, the generated information may include one or more of the "swing videos" and the "analysis data".

(1.3.1. Examples of Various Data)

First, description is given of examples of various types of data. FIG. 4 illustrates a sensor list constituting the sensor apparatus 30. Referring to FIG. 4, a sensor type, a maker, a model number, a full scale, and an ADC (Analog to Digital Converter) resolution are defined for three types of sensors. As an example, the sensor apparatus 30 may be configured by any one of the three types of sensors. However, the sensor apparatus 30 may be configured by sensors other than the three types of sensors.

FIG. 5 illustrates a list of transmission data from the sensor apparatus 30 to a partner paired with the sensor apparatus 30. As illustrated in FIG. 5, data indicated by "data type" in "axis" may be transmitted from the sensor apparatus 30 to the pairing partner. The characteristics of the data transmitted from the sensor apparatus 30 to the pairing partner may be as illustrated in "bit number", "full scale", and "sampling rate". The data transmitted from the sensor apparatus 30 to the pairing partner may be inputted to a golf application of the pairing partner.

FIG. 6 illustrates an example of analysis data of the data received by the pairing partner from the sensor apparatus 30. When analysis is performed on the data received by the pairing partner from the sensor apparatus 30, various analysis data as illustrated in "overview" in FIG. 6 are obtained. In addition, FIG. 6 illustrates types of various analysis data are indicated as "data type", and a possible range of the analysis data is indicated as "range". In the present embodiment, description is given mainly of a case where the data analysis is executed by the pairing partner; however, the data analysis may be executed by the server 10 instead of the pairing partner.

Description has been given hereinabove of the examples of various types of data.

(1.3.2. Sign In)

First, when the student intends to utilize a golf application in the terminal 20-1, the student signs in the golf application. When the trainer intends to utilize the golf application in the terminal 20-2, the trainer signs in the golf application. Here, description is given of a case where the trainer signs in the golf application in the terminal 20-2, and thereafter description is given of a case where the student signs in the golf application in the terminal 20-1.

FIG. 7 is an explanatory diagram of an example of screen transition in the case of signing in. When a starting operation of the golf application is inputted by the trainer through the operating section 220 in the terminal 20-2, as illustrated in FIG. 7, a sign-in screen 500 is displayed by the output section 250. When an ID (sign-in ID) and a password are inputted by the trainer on the sign-in screen 500 and authentication based on the ID and the password is successful, the output section 250 displays a trainer main screen 510 on the terminal 20-2. Description is given later of details of the trainer main screen 510 with reference to FIG. 8.

Meanwhile, when a starting operation of the golf application is inputted by the student through the operating section 220 in the terminal 20-1, as illustrated in FIG. 7, the sign-in screen 500 is displayed by the output section 250. When an ID (sign-in ID) and a password are inputted by the student on the sign-in screen 500 and authentication based on the ID and the password is successful, the output section 250 displays a student main screen 520 on the terminal 20-1. Description is given later of details of the student main screen 520 with reference to FIG. 11.

Description has been given hereinabove of the sign in.

(1.3.3. Trainer Main Screen)

Next, description is given of the trainer main screen. FIG. 8 illustrates an example of the trainer main screen 510 displayed on the terminal 20-2. The trainer main screen 510 includes respective objects (student selection objects) corresponding to one or a plurality of students (students 1 to 3 in the example illustrated in FIG. 8) taken charge of by the trainer. Information about the one or the plurality of students taken charge of by the trainer is stored by the server 10, and is acquired by the terminal 20-2 from the server 10. When the trainer selects any one of the student selection objects, the student main screen 520 (FIG. 11) corresponding to the student selection object is displayed on the terminal 20-2.

It is to be noted that, when a predetermined tab switching operation (e.g., right and left flick operations) is performed by the trainer, screen is switched from the trainer main screen 510 to a group-unit trainer screen.

FIG. 9 illustrates an example of a group-unit trainer screen 511 displayed on the terminal 20-2. The group-unit trainer screen 511 includes respective student selection objects corresponding to one or a plurality of users (students and/or trainers) on a group-unit basis. Information on the users belonging to each group is stored by the server 10, and is acquired by the terminal 20-2 from the server 10. When the trainer selects any one of the student selection objects, the student main screen 520 (FIG. 11) corresponding to the student selection object is displayed on the terminal 20-2.

It is to be noted that, when a predetermined tab switching operation (e.g., right and left flick operations) is performed by the trainer, screen is switched from the group-unit trainer screen 511 to an online lesson selection screen.

FIG. 10 illustrates an example of an online lesson selection screen 512 displayed on the terminal 20-2. The online lesson selection screen 512 includes respective lesson video selection objects corresponding to one or a plurality of students. Lesson videos are stored by the server 10, and are acquired by the terminal 20-2 from the server 10. When the trainer selects any one of the lesson video selection objects, an online lesson screen 522 (FIG. 13) corresponding to the lesson video selection object is displayed on the terminal 20-2.

Description has been given hereinabove of the trainer main screen.

(1.3.4. Student Main Screen)

Next, description is given of the student main screen. FIG. 11 illustrates an example of the student main screen 520. In a case where the student main screen 520 is displayed on the terminal 20-2 of the trainer, the student main screen 520 includes objects (swing video selection objects) for selection of a swing video of a student ("student 1" in the example illustrated in FIG. 11) corresponding to the student selection object selected by the trainer, and a swing recording start button 620. The swing video selection object includes the number of shots of the swing video and the type of a club used.

The swing video of the student is stored by the server 10, and information on the swing video of the student is acquired by the terminal 20-2 from the server 10. When the trainer selects any one of the swing video selection objects on the terminal 20-2, a swing display screen corresponding to the selected swing video selection object is displayed on the terminal 20-2. Description is given later of details of the swing video and the swing display screen. Further, when the trainer selects the swing recording start button 620, a swing video recording screen is displayed on the terminal 20-2.

Meanwhile, in a case where the student main screen 520 is displayed on the terminal 20-1 of the student, the student main screen 520 includes the swing video selection objects for selection of a swing video of a student himself or herself ("student 1" in the example illustrated in FIG. 11) who signed in and the swing recording start button 620.

The information on the swing video of the student is acquired by the terminal 20-1 from the server 10. When the student selects any one of the swing video selection objects on the terminal 20-1, a swing display screen corresponding to the selected swing video selection object is displayed on the terminal 20-1. Further, when the student selects the swing recording start button 620, a swing video recording screen is displayed on the terminal 20-1.

It is to be noted that, when a predetermined tab switching operation (e.g., right and left flick operations) is performed by the trainer or the student, screen is switched from the student main screen 520 to a lesson video screen.

FIG. 12 illustrates an example of a lesson video screen 521. The lesson video screen 521 includes lesson videos 621 (lesson videos 621-1 and 621-2) of the student. In addition to the swing video, the lesson video 621 includes feedback information (audio data, image data, etc.) provided by the trainer for the swing video. In addition, each lesson video screen 521 also includes date and time when the lesson video was captured. It is to be noted that when a predetermined tab switching operation (e.g., right and left flick operations) is performed by the trainer or the student, screen is switched from the lesson video screen 521 to the online lesson screen.

FIG. 13 illustrates an example of the online lesson screen 522. The online lesson screen 522 includes the lesson video 621-1, and includes feedback information (e.g., text data 622-1, 622-2, and 622-3) inputted by the trainer for the swing video included in lesson video 621-1. In addition, the online lesson screen 522 includes text data 622-4 and 622-5 inputted by the student for the feedback information (text data 622-1 and 622-2).

It is to be noted that, when a predetermined tab switching operation (e.g., right and left flick operations) is performed by the trainer or the student, screen is switched from the online lesson screen 522 to a profile screen.

FIG. 14 illustrates an example of a profile screen 523. The profile screen 523 includes a profile, a lesson list, and a shot list of a student. The profile, the lesson list, and the shot list of the student are stored by the server 10, and are acquired by the terminal 20-1 or 20-2 from the server 10. The shot list includes the number of shots for each date and time of the shot and for each type of a club used, and also includes a bar graph indicating a ratio of types of shots (hook, straight, and slice). Degree of improvement in the shot made by the student is grasped by such a shot list.

It is to be noted that, when a predetermined tab switching operation (e.g., right and left flick operations) is performed by the trainer or the student, screen is switched from the profile screen 523 to the online lesson screen 522.

Description has been given hereinabove of the student main screen.

(1.3.5. Flow from Start of Swing Display to Start of Swing Recording)

Next, description is given of flow from the start of swing display to the start of swing recording. FIG. 15 is an explanatory diagram of the flow from the start of swing display to the start of swing recording.

As illustrated in FIG. 15, the trainer main screen 510 displayed on the terminal 20-2 of the trainer includes respective student selection objects corresponding to one or a plurality of students taken charge of by the trainer. When the trainer selects any one of the student selection objects, the student main screen 520 corresponding to the student selection object is displayed on the terminal 20-2.

Meanwhile, in a case where the student main screen 520 is displayed on the terminal 20-1 of the student, the student main screen 520 includes the swing video selection objects for selection of a swing video of the student himself or herself ("student 1" in the example illustrated in FIG. 15) who signed in and the swing recording start button 620.

When the trainer selects any one of the swing video selection objects on the terminal 20-2, a swing display screen 532 corresponding to the selected swing video selection object is displayed on the terminal 20-2. Likewise, when the student selects any one of the swing video selection objects on the terminal 20-1, the swing display screen 532 corresponding to the selected swing video selection object is displayed on the terminal 20-1.

Further, when the trainer selects the swing recording start button 620 on the terminal 20-2, a swing recording screen 530 is displayed on the terminal 20-2. Likewise, when the student selects the swing recording start button 620 on the terminal 20-1, the swing recording screen 530 is displayed on the terminal 20-1.

Description has been given hereinabove of the flow from the start of swing display to the start of swing recording.

(1.3.6. Swing Recording)

Next, description is given of swing recording. FIG. 16 illustrates an example of the swing recording screen 530. First, a case is assumed where a student performs self-training of golf. In this situation, in a case where feedback information of the trainer on the playing state of the self-training performed by the student is obtained, a lesson (hereinafter also referred to as "online lesson") is performed in which the feedback information is confirmed by the student. In the online lesson, the swing recording screen 530 is displayed on the terminal 20-1 of the student.

It is to be noted that a mark indicating a level may be initially displayed on the swing recording screen 530. In a case where detection is made that the stationary state of the terminal has continued for a predetermined period of time, the display of the mark indicating the level may disappear. Then, the disappearance of the mark indicating the level enables a suitable timing of the start of the swing recording to be grasped.

As illustrated in FIG. 16, the swing recording screen 530 includes a through image before the start of imaging. In addition, the swing recording screen 530 includes a drawing start object 630, a camera switching object 631, coupling/non-coupling information 632 between a terminal upon image capturing currently displayed and the sensor apparatus 30, coupling/non-coupling information 633 between a current terminal and the sensor apparatus 30, and information 634 indicating a coupling state between the terminal upon image capturing currently displayed and the sensor apparatus 30.

In this situation, a case is assumed where the swing recording screen 530 is displayed on the terminal 20-1 of the student and the camera switching object 631 is selected by the student. In such a case, the imaging section 225 of the terminal 20-1 of the student starts imaging of the student who plays golf in the self-training, and obtains a moving image. Meanwhile, the sensor apparatus 30 paired with the terminal 20-1 of the student performs sensing to obtain sensor information. The sensor information is transmitted from the sensor apparatus 30, and is received by the communication section 240 of the terminal 20-1.

The control section 210 of the terminal 20-1 of the student detects an event on the basis of the sensor information received by the communication section 240. For example, the event may include one or more of a predetermined-time-based swing starting time point, a swing top time point, an impact time point, a swing end time point, a successful swing, a failed swing, the best swing, and the worst swing. Here, description is given mainly of a case where the event is an impact time point.

The control section 210 of the terminal 20-1 of the student generates the first generated information on the basis of the detected result of the event. As described above, in the present embodiment, description is given mainly of a case where the first generated information includes the swing video and the analysis data. The swing video is extracted from the moving image of the student who plays golf captured by the imaging section 225 of the terminal 20-1 on the basis of the detected result of the event.

More particularly, the sensor information received from the sensor apparatus 30 and the moving image captured by the imaging section 225 of the terminal 20-1 are synchronized in the control section 210. Then, in the swing video, a section in a moving image, of the moving image, corresponding to a section based on a detected time point of the event (e.g., a section from a time point predetermined several seconds before the impact time point to a time point several seconds after the impact time point, in a case where the impact time point is detected as the event) in the sensor information is extracted by the control section 210.

Further, the control section 210 analyzes the sensor information received from the sensor apparatus 30 on the basis of the detected result of the event to obtain the analysis data. More specifically, the analysis data may include one or more of an angle of a club face upon impact, an angle of collision between the club face and a ball upon impact, an angle of a trajectory of a club head upon impact, a head speed upon impact, and information indicating a hitting hand upon swinging.

When the first generated information (swing video and analysis data) is generated in the terminal 20-1 of the student, the output section 250 automatically switches the display from the swing recording screen 530 to the swing display screen 532. Then, the output section 250 displays the first generated information (swing video and analysis data) on the swing display screen 532.

It is to be noted that the output section 250 may output sound data, together with the imaging of the swing video, in a case where sound data are detected by the microphone. Then, it becomes possible to estimate good or bad shots with high accuracy by listening to a voice (such as a cheer) included in the sound data or a sound (such as a collision sound between a club and a ball) included in the sound data, or by knowing a voice recognition result for the voice or the sound.

It is to be noted that, when the student continuously performs the swing, a case is also assumed where the control section 210 newly generates generated information (third generated information (swing video and analysis data)) during display of the first generated information on the terminal 20-1 of the student. In such a case, the control section 210 may automatically switch from the display of the first generated information (swing video and analysis data) to display of the third generated information (swing video and analysis data) on the swing display screen 532.

The communication section 240 of the terminal 20-1 of the student transmits the first generated information (swing video and analysis data) to the server 10 via the network. In the server 10, the first generated information (swing video and analysis data) is received by the communication section 140, and is stored in the storage section 130. When the communication section 140 receives an acquisition request from the terminal 20-2 on the basis of an operation of the trainer, the transmission control section 114 controls transmission of the first generated information (swing video and analysis data) stored by the storage section 130 to the terminal 20-2.

When the first generated information (swing video and analysis data) is received by the communication section 240 in the terminal 20-2 of the trainer, the swing display screen 532 is displayed by the output section 250. It is to be noted that, in a case where sound data are detected by the microphone together with the imaging of the swing video, the output section 250 may also output the sound data also on the terminal 20-2 of the trainer.

In addition to the first generated information (swing video and analysis data), the name of the member who performs the swing, the type of a club used by the member, and information on the sensor apparatus 30 to be coupled to the terminal (e.g., product name, MAC address, etc.) may also be transmitted from the terminal 20-1 to the server 10 to be stored. In this situation, the terminal 20-2 of the trainer may acquire, from the server 10, and display the name of the member who performs the swing, the type of the club used by the member, and the information on the sensor apparatus 30 coupled to the terminal.

For example, the name of the member who performs the swing, the type of the club used by the member, and the information on the sensor apparatus 30 coupled to the terminal (e.g., product name, MAC address, etc.) may be selected by the student who uses the terminal 20-1.

FIG. 17 illustrates an example of the swing recording screen 530. Referring to FIG. 17, the swing recording screen 530 includes a member selection object 611, a club type selection object 612, and a sensor selection object 613. For example, when the student selects the member selection object 611 on the terminal 20-1 of the student, a member selection screen may be displayed.

FIG. 18 illustrates an example of a member selection screen 541. Referring to FIG. 18, the member selection screen 541 includes, as names of members, "trainer", "student 1", "student 2", "student 3", and "noname". In the member selection screen 541, the name of any one of the members may be selected by the student from the names of these members, as the name of the member who performs the swing.

Returning to FIG. 17, the description is continued. For example, when the club type selection object 612 is selected by the student on the terminal 20-1 of the student, a club selection screen may be displayed.

FIG. 19 illustrates an example of a club selection screen 542. Referring to FIG. 19, the club selection screen 542 includes, as club types, "driver (1W)", "3-wood (3W)", . . . , and "sand wedge (SW)". In the club selection screen 542, the student may select any one of the club types from these club types, as the type of a club used by the member.

It is to be noted that the description has been given here of the case where the type of the club used by the member is manually selected; however, the type of a club used by the member may be automatically selected. For example, in a case where the type of a club often used by the member is associated with the name of the member, the type of the club used by the member may be selected on the basis of such association and the name of the member. Alternatively, when the length, material, weight, and the like of the club often used by the member are registered, the type of club used by the member may be selected on the basis of these pieces of information.

Returning to FIG. 17, the description is continued. For example, when the sensor selection object 613 is selected by the student on the terminal 20-1 of the student, a sensor selection screen may be displayed.

FIG. 20 illustrates an example of a sensor selection screen 543. Referring to FIG. 20, the sensor selection screen 543 includes, as information related to the sensor apparatus 30, "sensor C1", "sensor C2", . . . , and "sensor C5". On the sensor selection screen 543, the student may select, as information on the sensor apparatus 30 coupled to the terminal, information on any one of the sensor apparatuses 30 from information on these sensor apparatuses 30.

It is to be noted that the description has been given here of the case where the information on the sensor apparatus 30 coupled to the terminal is manually selected; however, the information on the sensor apparatus 30 coupled to the terminal may be automatically selected. For example, in a case where information on the sensor apparatus 30 attachable to a club of a certain type is associated with the club type, information on the sensor apparatus 30 to be coupled to the terminal may be selected on the basis of such association and the club type.

Returning to FIG. 17, the description is continued. For example, when the sensor selection object 613 is selected by the student on the terminal 20-1 of the student, the sensor selection screen may be displayed.

The description has been given hereinabove of the swing recording in the online lesson.

(1.3.7. Swing Display)

Description is given of swing display. FIG. 21 illustrates an example of the swing display screen 532. In the online lesson, when the first generated information (swing video and analysis data) is received from the server 10 by the communication section 240 of the terminal 20-2 of the trainer, the first generated information (swing video and analysis data) is displayed by the output section 250.

Referring to FIG. 21, a swing video is displayed on the swing display screen 532. As examples of the analysis data, there are displayed: an angle of a trajectory of a club head upon impact (reference numeral of the trajectory is "644" and the angle is "−5.1"); an angle at which a club face and a ball collide upon impact (reference numeral of the club face is "645" and the numerical value is "9.8"); an angle at which the club face and the ball collide upon impact (reference numeral of the club face is "646" and the numerical value is "8.5"); a speed (head speed upon impact); and a distance (carry) obtained by analysis on the basis of the type and the speed of the club.

Referring to FIG. 21, the swing display screen 532 displayed by the terminal 20-2 of the trainer includes a drawing start object 630, a favorite registration object 635, a swing video comparison object 636, a display object 637 indicating a swing starting point, a display object 638 indicating a swing top point, a display object 639 indicating a swing impact point, a 180-degree inversion object 640 for performing 180-degree inversion of the swing video with respect to the axis, a swing recording screen transition object 641 for transition to the swing recording screen, a recording start object 642, and a time axis 643.

As illustrated in this example, the output section 250 displays, on the terminal 20-2 of the trainer, display objects (the display object 637 indicating the swing starting point, the display object 638 indicating the swing top point, and the display object 639 indicating the swing impact point) at positions corresponding to events along the time axis 643. Further, in a case where any one of the positions on the time axis 643 is designated as a designated position by the trainer, the position in the first generated information (swing video and analysis data) corresponding to the designated position is displayed by the output section 250. This facilitates the output of the first generated information (swing video and analysis data) at a desired timing.

The swing display screen 532 displayed by the terminal 20-2 of the trainer includes the drawing start object 630, the favorite registration object 635, the swing video comparison object 636, the display object 637 indicating a swing starting point, the display object 638 indicating a swing top point, the display object 639 indicating a swing impact point, the 180-degree inversion object 640 for performing the 180-degree inversion of the swing video with respect to the axis, the swing recording screen transition object 641 for transition to the swing recording screen, the recording start object 642, and the time axis 643.

It is to be noted that, when a predetermined tab switching operation (e.g., right and left flick operations) is performed by the trainer, screen is switched from the swing display screen 532 to a swing trajectory screen. FIG. 22 illustrates an example of a swing trajectory screen 551. The swing trajectory screen 551 includes club head trajectory information 651.

It is to be noted that, when a predetermined tab switching operation (e.g., right and left flick operations) is performed by the trainer, screen is switched from the swing trajectory screen 551 to an estimated ball trajectory screen. FIG. 23 illustrates an example of an estimated ball trajectory screen 552. The estimated ball trajectory screen 552 includes an estimated ball trajectory 652. The estimated ball trajectory 652 may be calculated on the basis of a club type, a speed, a distance, an angle of the club face upon impact, an angle of collision between the club face and the ball upon impact, and an angle of a trajectory of the club head upon impact, which are included in the analysis data.

FIG. 24 illustrates an example of the swing display screen 532. A case is assumed where the trainer wishes to provide feedback information to the student for the first generated information (swing video and analysis data) displayed on the swing display screen 532. In this situation, the trainer selects the recording start object 642, inputs audio data as an example of the feedback information, selects the drawing start object 630, and inputs image data (image data 661-1 to 661-3 in the example illustrated in FIG. 24) as an example of the feedback information. Then, the control section 210 of the terminal 20-2 of the trainer controls transmission of the audio data and image data as examples of the feedback information to the server 10.

It is to be noted that, here, audio data and image data are assumed as examples of the feedback information. However, the feedback information is not limited to audio data and image data. The feedback information may include one or more of audio data, text data, and image data inputted by the trainer for the first generated information (swing video and analysis data). In the server 10, audio data and image data as examples of the feedback information are received by the communication section 140 and stored by the storage section 130.

FIG. 25 is an explanatory diagram of 180-degree inversion display of the first generated information (swing video and analysis data) with respect to the axis. Referring to FIG. 25, a swing display screen 532 is displayed on the terminal 20-2 of the trainer. Here, in a case where a predetermined 180-degree inversion operation (e.g., selection of the 180- degree inversion object 640) is detected, the control section 210 of the terminal 20-2 of the trainer may perform 180-degree inversion display of the first generated information (swing video and analysis data) with respect to the axis. It is to be noted that performing the 180-degree inversion display of an image captured on one axis (viewpoint) enables a right-left inverted image to be displayed (as a result of the right-left inversion, the dominant hand of a person who performs the swing undergoes right-left inversion display).

In the example illustrated in FIG. 25, a swing display screen 571 is displayed on the terminal 20-2 of the trainer. In the swing display screen 571, the swing video undergoes the 180-degree inversion display with respect to the axis, and the analysis data undergoes the 180-degree inversion display with respect to the axis, i.e., the angle of the trajectory of the club head upon impact (reference numeral "671" of the trajectory), the angle of collision between the club face and the ball upon impact (reference numeral "672" of the club face), and the angle of collision between the club face and the ball upon impact (reference numeral "673" of the club face) undergo 180-degree inversion with respect to the axis.

FIG. 26 is an explanatory diagram of selection of a swing of a comparative partner. Referring to FIG. 26, the swing display screen 532 is displayed on the terminal 20-2 of the trainer. Here, the control section 210 of the terminal 20-2 of the trainer may display a comparative video screen 583 in a case where a predetermined comparative operation (e.g., selection of the swing video comparison object 636) is detected and a swing of a comparative partner on a comparative swing selection screen 582 is selected.

FIG. 27 illustrates an example of a comparative swing selection screen 584. The comparative swing selection screen 584 illustrated in FIG. 27 exemplifies a case of narrowing down the swing video of the comparative partner by limiting the members. FIG. 28 illustrates an example of the comparative swing selection screen 584. The comparative swing selection screen 584 illustrated in FIG. 28 exemplifies a case of narrowing down the swing video of the comparative partner by limiting the club types.

FIG. 29 illustrates an example in which two pieces of generated information are displayed side by side on the same screen. In the example illustrated in FIG. 29, a swing video V1 in which the student is captured and a swing video V2 in which the trainer is captured are displayed side by side on the same screen in a case where a second generated information (the swing video V2 and analysis data) different from the first generated information (the swing video V1 and analysis data) is selected as a display target on the same screen as the first generated information (swing video and analysis data). Further, in the example illustrated in FIG. 29, the respective analysis data are so displayed as to be distinguished from one another (as an example, as to be distinguished by different colors).

Further, the comparative partner may undergo automatic 180-degree inversion display with respect to the axis. For example, in a case where information indicating a hitting hand included in the first generated information (the swing video V1 in which the student is captured and the analysis data) and information indicating a hitting hand included in the second generated information (the swing video V2 in which the trainer is captured and the analysis data) are opposite to each other, the control section 210 of the terminal 20-2 of the trainer performs the automatic 180-degree inversion display of the second generated information (the swing video V2 in which the trainer is captured and the analysis data) with respect to the axis.

Further, the comparative partner may be automatically changed in accordance with change in the club used by the student. For example, in a case where the type of club used by the student is changed, the control section 210 of the terminal 20-2 of the trainer may automatically switch the display from the display of the second generated information (the swing video V2 in which the trainer is captured and the analysis data) to the display of the third generated information corresponding to the type of the changed club.

FIG. 30 illustrates an example in which two pieces of generated information are displayed in a superimposed manner on the same screen. In the example illustrated in FIG. 30, the swing video V1 in which the student is captured and the swing video V2 in which the trainer is captured are displayed in a superimposed manner on the same screen in a case where the second generated information (the swing video V2 and the analysis data) different from the first generated information (the swing video V1 and the analysis data) is selected as the display target on the same screen as the first generated information (swing video and analysis data). Further, in the example illustrated in FIG. 30, the respective analysis data are so displayed as to be distinguished from one another (as an example, as to be distinguished by different colors).

It is to be noted that, even in a case where two pieces of generated information are displayed in a superimposed manner on the same screen, the comparative partner may undergo the automatic 180-degree inversion display with respect to the axis similarly to the case where the two pieces of generated information are displayed side by side on the same screen. Also in the case where two pieces of generated information are displayed in a superimposed manner on the same screen, the comparative partner may be automatically changed in accordance with the change in the club used by the student similarly to the case where the two pieces of generated information are displayed side by side on the same screen.

Further, the second generated information (the swing video V2 in which the trainer is captured) may be enlarged, reduced, or moved on the basis of a predetermined changing operation. More particularly, in a case where the trainer performs a pinch-out operation on the swing video V2, the swing video V2 may be enlarged. Further, in a case where the trainer performs a pinch-in operation on the swing video V2, the swing video V2 may be reduced. Further, in a case where the trainer performs a drag operation on the swing video V2, the swing video V2 may be moved.

It is to be noted that, when a predetermined tab switching operation (e.g., right and left flick operations) is performed by the trainer, screen is switched from the comparative video screen 583 to a comparative swing trajectory screen. FIG. 31 illustrates an example of a comparative swing trajectory screen 585. The comparative swing trajectory screen 585 includes the club head trajectory information 651 as an example of the first generated information (analysis data), and includes a club head trajectory information 685 as an example of the second generated information (analysis data).

When a predetermined tab switching operation (e.g., right and left flick operations) is performed by the trainer, screen is switched from the comparative swing trajectory screen 585 to a comparative estimated ball trajectory screen. FIG. 32 illustrates an example of a comparative estimated ball trajectory screen 586. The comparative estimated ball trajectory screen 586 includes an estimated ball trajectory 686 in addition to the estimated ball trajectory 652. The estimated ball trajectory 652 may be calculated on the basis of a club type, a speed, and a distance which are included in the first generated information (analysis data). The estimated ball trajectory 686 may be calculated on the basis of a club type, speed, a distance, an angle of the club face upon impact, an angle of collision between the club face and the ball upon impact, and an angle of a trajectory of the club head upon impact, which are included in the second generated information (analysis data).

When the communication section 140 receives an acquisition request from the terminal 20-2 on the basis of an operation of the trainer, the transmission control section 114 controls transmission of the first generated information (swing video and analysis data) stored by the storage section 130 of the server 10 to the terminal 20-2 of the student. The output section 250 of the terminal 20-2 of the student outputs audio data as an example of the feedback information, and displays image data. The student is able to confirm the feedback information of the trainer on the basis of the audio data and the image data.

When feedback information of the trainer is obtained in this manner for the playing state of the self-training in the online lesson, the student is able to easily confirm the feedback information. Achievement of deep communication between the student and the trainer makes it possible to always give a feeling that the student and the trainer are connected together.

In a case where the student inputs auxiliary information that assists the play (e.g., in a case where graphic data are inputted onto the through image after selection of the drawing start object 630 in the swing recording screen 530) before (or after) the generation of the first generated information (swing video and analysis data) in the terminal 20-1 of the student, the first generated information (swing video and analysis data) and the auxiliary information may be associated with each other to be transmitted to the server 10. In this situation, when the first generated information (swing video and analysis data) is acquired from the server 10 and displayed on the terminal 20-2 of the trainer, the auxiliary information may also be acquired from the server 10 to be displayed.

[1.4. Hardware Configuration Example]

Next, description is given of a hardware configuration of the server 10 according to an embodiment of the present disclosure with reference to FIG. 32. FIG. 32 is a block diagram illustrating an example of a hardware configuration of the server 10 according to an embodiment of the present disclosure. It is to be noted that description is given here of an example of the hardware configuration of the server 10; however, the hardware configuration of the terminal 20 may also be achieved similarly to the example of the hardware configuration of the server 10 described here.

As illustrated in FIG. 32, the server 10 includes a CPU (Central Processing unit) 901, a ROM (Read Only Memory) 903, and a RAM (Random Access Memory) 905. Further, the server 10 may include a host bus 907, a bridge 909, an external bus 911, an interface 913, an input device 915, an output device 917, a storage device 919, a drive 921, a coupling port 923, and a communication device 925. In addition, the server 10 may include an imaging device 933 and a sensor 935, as necessary. The servers 10 may include a processing circuit as referred to as a DSP (Digital Signal Processor) or ASIC (Application Specific Integrated Circuit), instead of or in addition to the CPU 901.

The CPU 901 serves as an arithmetic processing unit and as a control unit, and controls all or part of the operations of the server 10 in accordance with various programs recorded in the ROM 903, the RAM 905, the storage device 919, or a removable recording medium 927. The ROM 903 stores a program to be used by the CPU 901 and arithmetic parameters. The RAM 905 temporarily stores a program to be used in execution of the CPU 901, a parameter that appropriately varies in the execution, and the like. The CPU 901, the ROM 903, and the RAM 905 are coupled to one another by the host bus 907 configured by an internal bus such as a CPU bus. Further, the host bus 907 is coupled to the external bus 911 such as a PCI (Peripheral Component Interconnect/Interface) bus via the bridge 909.

The input device 915 is a device operated by a user, such as a button, for example. The input device 915 may include a mouse, a keyboard, a touch panel, a switch, a lever, and the like. Further, the input device 915 may also include a microphone that detects a voice of the user. The input device 915 may be, for example, a remote control device that utilizes infrared rays or other radio waves, or may be an externally coupled apparatus 929 such as a mobile phone responsive to the operation of the server 10. The input device 915 includes an input control circuit that generates an input signal on the basis of information inputted by the user and that outputs the generated inputted signal to the CPU 901. The user operates the input device 915 to thereby input various types of data to the server 10 and instruct a processing operation. Further, the imaging device 933 described later may also capture images of the movement of the hand of the user, the fingers of the user, and the like to thereby serve as an input device. In this situation, a pointing position may be determined in accordance with the movement of the hand or the orientation of the fingers.

The output device 917 is configured by a device that makes it possible to visually or audibly notify the user of acquired information. The output device 917 may be, for example, a display device such as an LCD (Liquid Crystal Display) and an organic EL (Electro-Luminescence) display, or a sound output device such as a speaker and a headphone. Further, the output device 917 may include a PDP (Plasma Display Panel), a projector, a hologram, a printer device, and the like. The output device 917 outputs a result obtained by processing of the server 10 as video such as a text or an image, or outputs a sound such as audio or acoustic. Further, the output device 917 may include a light for brightening the surroundings.

A storage device 919 is a device for data storage configured as an example of a storage section of the server 10. The storage device 919 is configured by, for example, a magnetic storage device such as an HDD (Hard Disk Drive), a semiconductor storage device, an optical storage device, a magneto-optical storage device, or the like. The storage device 919 stores a program to be executed by the CPU 901, various types of data, various types of data acquired from the outside, and the like.

The drive 921 is a reader/writer for the removable recording medium 927 such as a magnetic disk, an optical disk, a magneto-optical disk, or a semiconductor memory, and is built in or externally attached to the server 10. The drive 921 reads information recorded on the removable recording medium 927 mounted thereon, and outputs the read information to the RAM 905. In addition, the drive 921 writes a record into the removable recording medium 927 mounted thereon.

The coupling port 923 is a port for direct coupling of an apparatus to the server 10. The coupling port 923 may be, for example, a USB (Universal Serial Bus) port, an IEEE1394 port, an SCSI (Small Computer System Interface) port, or the like. In addition, the coupling port 923 may be an RS-232C port, an optical audio terminal, an HDMI (registered trademark; High-Definition Multimedia Interface) port, or the like. Coupling an externally coupled apparatus 929 to the coupling port 923 may allow various types of data to be exchanged between the server 10 and the externally coupled apparatus 929.

The communication device 925 is, for example, a communication interface configured by a communication device or the like for being coupled to a network 931. The communication device 925 may be, for example, a communication card for wired or wireless LAN (Local Area Network), Bluetooth (registered trademark), or WUSB (Wireless USB). In addition, the communication device 925 may be a router for optical communication, a router for ADSL (Asymmetric Digital Subscriber Line), or a modem for various types of communication. The communication device 925 transmits and receives signals, etc. to and from the Internet or other communication apparatuses using a predetermined protocol such as TCP/IP. Further, the network 931 coupled to the communication device 925 is a wired or wireless network, and is, for example, the Internet, a home LAN, infrared communication, radio wave communication, satellite communication, or the like.

The imaging device 933 is, for example, a device that captures an image of a real space using various members such as an imaging device, e.g., a CCD (Charge Coupled Device) or a CMOS(Complementary Metal Oxide Semiconductor) and a lens for controlling imaging of a subject image on the imaging device, and that generates the captured image. The imaging device 933 may capture a still image or may capture a moving image.

The sensor 935 is, for example, one of various sensors such as a distance measuring sensor, an acceleration sensor, a gyro sensor, a geomagnetic sensor, a vibration sensor, an optical sensor, and a sound sensor. The sensor 935 acquires, for example, information on the state of the server 10 itself, such as posture of the housing of the server 10, and information on surrounding environment of the server 10, such as brightness and noise around the server 10. The sensor 935 may also include a GPS (Global Positioning System) sensor that receives a GPS signal to measure latitude, longitude, and altitude of the apparatus.

2. Closing

As described above, according to an embodiment of the present disclosure, there is provided an information processor including: the acquisition section that acquires feedback information regarding the first generated information generated using the detected result of the event based on the sensor information indicating information related to the first user who plays golf, from the terminal of the second user different from the first user; and the transmission control section that controls transmission of the feedback information to the terminal of the first user. According to such a configuration, it is possible to more efficiently present the feedback information from the second user to the first user regarding the playing state of the first user.

Although the description has been given in detail hereinabove of the preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

In the above, the description has been given mainly of the case where the display (swing display) of the recorded generated information (swing video and analysis data) is performed by the terminal 20-2 of the trainer. However, a swing display similar to the swing display performed by the terminal 20-2 of the trainer may be performed by the terminal 20-1 of the student. This enables the student to also confirm the recorded generated information (swing video and analysis data).

Further, in the above description, the case is assumed where an online lesson is performed, and accordingly the case is mainly assumed where recording (swing recording) of the generated information (swing video and analysis data) is performed by the terminal 20-1 of the student. However, during an indoor lesson, swing recording may be performed by the terminal 20-2 of the trainer while the trainer instructs the student on golf (while inputting feedback information).

That is, the control section 210 of the terminal 20-2 of the trainer generates the first generated information on the basis of the detected result of the event, and the communication section 240 transmits the first generated information and the feedback information to the server 10. In the server 10, the acquisition section 112 acquires the first generated information and the feedback information from the terminal 20-2 of the trainer, and the storage section 130 stores the first generated information and the feedback information. The terminal 20-1 of the student outputs the first generated information and the feedback information in response to an acquisition request based on an operation of the student.

The student is able to review past lessons (lesson review) in detail by confirming the first generated information and the feedback information outputted in this manner (a retrospective lesson experience becomes possible). Further, even in a case where the content of the lesson is forgotten, it is possible to recall the past lesson by confirming the first generated information and the feedback information outputted in this manner.

In the above description, the case is mainly assumed where one trainer instructs one student; however, a plurality of trainers may instruct one student. For example, in addition to a trainer who performs an indoor lesson for a student, there may be a trainer who performs a lesson through a round (round lesson) for the student. In this situation, it is preferable that the first generated information (swing video and analysis data), the feedback information, and the like be shared by the plurality of trainers.

That is, when the communication section 140 receives an acquisition request from a terminal on the basis of an operation of a second trainer (third user), the transmission control section 114 may control transmission of the first generated information (swing video and analysis data) stored by the storage section 130 of the server 10 to the terminal of the second trainer (third user).

Further, in the terminal 20, the control section 210 may determine the analysis data; in a case where the analysis data are out of a predetermined range, the control section 210 may cause the output section 250 to output to the effect that an error has occurred. For example, in a case where the trajectory information of the club head as an example of the first generated information (analysis data) is out of a predetermined range (e.g., the ground), the control section 210 may cause the output section 250 to output to the effect that an error has occurred.

Further, in the above, the description has been given of the case where the impact time point is detected as an example of the event; however, a threshold value for determining the impact time point (an impact determination threshold value) may be changed on the basis of the sensor information. For example, the impact determination threshold value may be changed in accordance with shot types, club types, and attributes (e.g., gender, age, and whether to be a kid or not) of a person who performs the swing.

Further, in the above, the description has been given mainly of the case where a distance (carry) is obtained on the basis of the type and speed of the club; however, other factors may be considered in the estimation of the distance (carry). For example, after the swing is completed, the distance (carry), the type of club, the environment in which the swing is performed (weather, wind strength, etc.), and the place at which the swing is performed (the length of turf at a position where the swing is performed, a degree of inclination of the ground, etc.) may be inputted, and these pieces of information may be used for machine learning to improve the estimation accuracy of the distance (carry).

Further, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the technical scope of the present disclosure also includes the following configurations.

(1)

An information processor including:

an acquisition section that acquires feedback information regarding first generated information generated using a detected result of an event based on sensor information indicating information related to a first user who plays golf, from a terminal of a second user different from the first user; and a transmission control section that controls transmission of the feedback information to a terminal of the first user.

(2)

The information processor according to (1), in which the first generated information includes a playing image extracted from a captured moving image of the first user who plays golf on a basis of the detected result of the event.

(3)

The information processor according to (2), in which the sensor information and the moving image are synchronized, and the playing image includes an image of a section in the moving image, out of the moving image, corresponding to a section based on a detected time point of the event in the sensor information.

(4)

The information processor according to any one of (1) to (3), in which the first generated information includes analysis data obtained on a basis of the detected result of the event, and the analysis data includes one or more of an angle of a club face upon impact, an angle of collision between the club face and a ball upon the impact, an angle of a trajectory of a club head upon the impact, a head speed upon the impact, and information indicating a hitting hand upon swinging.

(5)

The information processor according to any one of (1) to (4), in which a display object is displayed at a position corresponding to the event along a time axis, and in a case where any position on the time axis is designated as a designated position, a position corresponding to the designated position in the first generated information is displayed.

(6)

The information processor according to any one of (1) to (5), in which, in a case where second generated information different from the first generated information is selected as a display target on a same screen as the first generated information, the first generated information and the second generated information are displayed in a superimposed manner or side by side on the same screen.

(7)

The information processor according to (6), in which the second generated information is configured to be enlarged, reduced, or moved on a basis of a predetermined changing operation.

(8)

The information processor according to (6) or (7), in which, in a case where information indicating the hitting hand included in the first generated information and information indicating a hitting hand included in the second generated information are opposite to each other, display of the second generated information is automatically inversed by 180 degrees with respect to an axis.

(9)

The information processor according to any one of (6) to (8), in which, in a case where a type of a club used by the first user is changed, switching is automatically performed from the display of the second generated information to display of third generated information corresponding to the changed type of the club.

(10)

The information processor according to any one of (1) to (9), in which, in a case where a predetermined 180-degree inversion operation is detected, 180-degree inversion display of the first generated information is performed with respect to the axis.

(11)

The information processor according to any one of (1) to (10), in which, in a case where third generated information is newly generated during display of the first generated information, switching is automatically performed from the display of the first generated information to display of the third generated information.

(12)

The information processor according to any one of (1) to (11), in which, in a case where auxiliary information that assists the play is inputted before or after the generation of the first generated information, the first generated information and the auxiliary information are associated with each other, and the auxiliary information is also displayed when the first generated information is displayed.

(13)

The information processor according to any one of (1) to (12), in which the acquisition section acquires the first generated information and the feedback information from the terminal of the second user.

(14)

The information processor according to any one of (1) to (12), in which, in a case where the first generated information is acquired from the terminal of the first user, the transmission control section controls transmission of the first generated information to the terminal of the second user.

(15)
The information processor according to any one of (1) to (12), in which the transmission control section further controls transmission of the feedback information to a terminal of a third user.
(16)
The information processor according to any one of (1) to (15), in which the event includes one or more of a predetermined-time-based swing starting time point, a swing top time point, an impact time point, a swing end time point, a successful swing, a failed swing, best swing, and worst swing.
(17)
The information processor according to any one of (1) to (16), in which the feedback information includes one or more of audio data, text data, and image data inputted by the second user for the first generated information.
(18)
The information processor according to any one of (1) to (17), in which the first user includes a student who receives a golf lesson from the second user.
(19)
An information processing method including:
acquiring feedback information regarding first generated information generated using a detected result of an event based on sensor information indicating information related to a first user who plays golf from a terminal of a second user different from the first user; and
controlling transmission of the feedback information to a terminal of the first user by a processor.
(20)
A program that causes a computer to serve as an information processor, the information processor including:
an acquisition section that acquires feedback information regarding first generated information generated using a detected result of an event based on sensor information indicating information related to a first user who plays golf, from a terminal of a second user different from the first user; and
a transmission control section that controls transmission of the feedback information to a terminal of the first user.

REFERENCE NUMERALS LIST 1 information processing system
10 server
110 control section
112 acquisition section
113 calculation section
114 transmission control section
130 storage section
140 communication section
20 terminal
210 control section
220 operating section
225 imaging section
230 storage section
240 communication section
250 output section
30 sensor apparatus
40 server

The invention claimed is:
1. An information processor, comprising:
a central processing unit (CPU) configured to:
acquire first generated information from a first terminal of a first user who plays golf, wherein
the first generated information is generated by the first terminal based on a detection of occurrence an event,
the occurrence of the event is detected based on sensor information indicating information related to the first user,
the first generated information includes a playing video that includes a section of a moving image of the first user captured by the first terminal, and
the section of the moving image is extracted from the moving image based on a time point corresponding to the detection of the occurrence of the event;
acquire feedback information regarding the first generated information from a second terminal of a second user different from the first user; and
control transmission of the feedback information to the first terminal of the first user.

2. The information processor according to claim 1, wherein
the playing video includes the section of the moving image extracted from a first time point to a second time point,
the first time point is a first number of seconds before the time point corresponding to the detection of the occurrence of the event, and
the second time point is a second number of seconds after the time point corresponding to the detection of the occurrence of the event.

3. The information processor according to claim 1, wherein
the sensor information and the moving image are synchronized, and
the section of the moving image corresponding to the time point corresponding to the detection of the occurrence of the event is extracted based on the synchronized sensor information and the moving image.

4. The information processor according to claim 1, wherein
the first generated information further includes analysis data obtained based on the detection of the occurrence of the event, and
the analysis data includes at least one of an angle of a club face upon impact, an angle of collision between the club face and a ball upon the impact, an angle of a trajectory of a club head upon the impact, a head speed upon the impact, and information indicating a hitting hand upon swinging.

5. The information processor according to claim 1, wherein
a display object is displayed at a position corresponding to the event along a time axis, and
based on designation of any position on the time axis as a designated position, a position corresponding to the designated position in the first generated information is displayed.

6. The information processor according to claim 1, wherein
based on selection of second generated information as a display target on a same screen as the first generated information, the first generated information and the second generated information are displayed in one of a superimposed manner or side by side on the same screen, and
the second generated information is different from the first generated information.

7. The information processor according to claim 6, wherein the second generated information is configured to be enlarged, reduced, or moved based on a changing operation.

8. The information processor according to claim 6, wherein, based on a hitting hand included in the first generated information and a hitting hand included in the second generated information being opposite to each other, display of the second generated information is automatically inversed by 180 degrees with respect to an axis.

9. The information processor according to claim 6, wherein, based on a change of a type of a club used by the first user, display of the second generated information is switched automatically to display of third generated information corresponding to the changed type of the club.

10. The information processor according to claim 1, wherein, based on detection of a 180-degree inversion operation, 180-degree inversion display of the first generated information is performed with respect to an axis.

11. The information processor according to claim 1, wherein, based on generation of third generated information during display of the first generated information, the display of the first generated information is automatically switched to display of the third generated information.

12. The information processor according to claim 1, wherein
based on input of auxiliary information that assists to play before or after the generation of the first generated information, the first generated information and the auxiliary information are associated with each other, and
the auxiliary information is displayed along with the first generated information.

13. The information processor according to claim 1, wherein the CPU is further configured to acquire the first generated information and the feedback information from the second terminal of the second user.

14. The information processor according to claim 1, wherein the CPU is further configured to control transmission of the first generated information to the second terminal of the second user.

15. The information processor according to claim 1, wherein the CPU is further configured to control transmission of the feedback information to a third terminal of a third user.

16. The information processor according to claim 1, wherein the event includes at least one of a time-based swing starting time point, a swing top time point, an impact time point, a swing end time point, a successful swing, a failed swing, best swing, and worst swing.

17. The information processor according to claim 1, wherein the feedback information includes at least one of audio data, text data, and image data inputted by the second user for the first generated information.

18. The information processor according to claim 1, wherein the first user corresponds to a student who receives a golf lesson from the second user.

19. An information processing method, comprising:
acquiring first generated information from a first terminal of a first user who plays golf, wherein
the first generated information is generated by the first terminal based on a detection of occurrence an event,
the occurrence of the event is detected based on sensor information indicating information related to the first user,
the first generated information includes a playing video that includes a section of a moving image of the first user captured by the first terminal, and
the section of the moving image is extracted from the moving image based on a time point corresponding to the detection of the occurrence of the event;
acquiring feedback information regarding the first generated information from a second terminal of a second user different from the first user; and
controlling transmission of the feedback information to the first terminal of the first user.

20. A non-transitory computer-readable medium having stored thereon, computer-executable instructions which, when executed by a computer, cause the computer to execute operations, the operations comprising:
acquiring first generated information from a first terminal of a first user who plays golf, wherein
the first generated information is generated by the first terminal based on a detection of occurrence an event,
the occurrence of the event is detected based on sensor information indicating information related to the first user,
the first generated information includes a playing video that includes a section of a moving image of the first user captured by the first terminal, and
the section of the moving image is extracted from the moving image based on a time point corresponding to the detection of the occurrence of the event;
acquiring feedback information regarding the first generated information from a second terminal of a second user different from the first user; and
controlling transmission of the feedback information to the first terminal of the first user.

* * * * *